(12) United States Patent
Mori et al.

(10) Patent No.: US 7,696,861 B2
(45) Date of Patent: Apr. 13, 2010

(54) TIRE INFLATION PRESSURE DETECTING APPARATUS WITH FUNCTION OF IDENTIFYING RUNNING AND SPARE WHEELS

(75) Inventors: Masashi Mori, Oobu (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 11/713,102

(22) Filed: Mar. 2, 2007

(65) Prior Publication Data

US 2007/0205883 A1 Sep. 6, 2007

(30) Foreign Application Priority Data

Mar. 2, 2006 (JP) ............... 2006-055793

(51) Int. Cl.
*B60R 25/10* (2006.01)
(52) U.S. Cl. .................. 340/426.33; 340/442; 340/447; 340/505; 116/34 R; 200/61.22
(58) Field of Classification Search ............ 340/426.33, 340/422, 447, 505, 825.54, 44, 825.542; 116/34 R; 200/61.22; 73/146–146.8
See application file for complete search history.

(56) References Cited

U.S. PATENT DOCUMENTS

| | | | |
|---|---|---|---|
| 5,602,524 A | | 2/1997 | Mock et al. |
| 7,131,323 B2 * | | 11/2006 | Hirota .................. 73/146 |
| 7,437,921 B2 * | | 10/2008 | Delaporte ................ 73/146.5 |
| 2005/0172707 A1 | | 8/2005 | Kanatani et al. |
| 2006/0012475 A1 | | 1/2006 | Froitzheim et al. |
| 2006/0017554 A1 * | | 1/2006 | Stewart et al. .............. 340/447 |
| 2006/0042368 A1 | | 3/2006 | Hirota |
| 2007/0008097 A1 | | 1/2007 | Mori et al. |

FOREIGN PATENT DOCUMENTS

| | | |
|---|---|---|
| CN | 1646338 A | 7/2005 |
| EP | 1 319 531 | 6/2003 |

(Continued)

OTHER PUBLICATIONS

Chinese Office Action dated Feb. 6, 2009 issued in corresponding Chinese Application No. 200710092396.7, with English translation.

(Continued)

*Primary Examiner*—George A Bugg
*Assistant Examiner*—Hongmin Fan
(74) *Attorney, Agent, or Firm*—Nixon & Vanderhye P.C.

(57) ABSTRACT

According to the present invention, there is provided a wheel identifying apparatus for a vehicle which includes a transmitter, a signal strength determiner, a variation determiner, and a wheel identifier. The transmitter is located on the body of the vehicle and working to transmit a signal during running of the vehicle. The signal strength determiner is located on a wheel of the vehicle away from the rotational axis of the wheel and works to determine strength of the signal thereat. The variation determiner works to determine a variation in the strength of the signal determined by the signal strength determiner. The wheel identifier is configured to identify the wheel as a spare wheel located on the body of the vehicle when the variation determined by the variation determiner is substantially zero.

27 Claims, 12 Drawing Sheets

FOREIGN PATENT DOCUMENTS

| | | |
|---|---|---|
| EP | 1 863 658 | 12/2007 |
| JP | 07-507513 | 8/1995 |
| JP | 3212311 | 7/2001 |
| JP | 2003-159920 | 6/2003 |
| JP | 2007-15491 | 1/2007 |

OTHER PUBLICATIONS

Extended European Search Report dated Oct. 14, 2009 issued in corresponding European Application No. 07004058.9-2425.

* cited by examiner

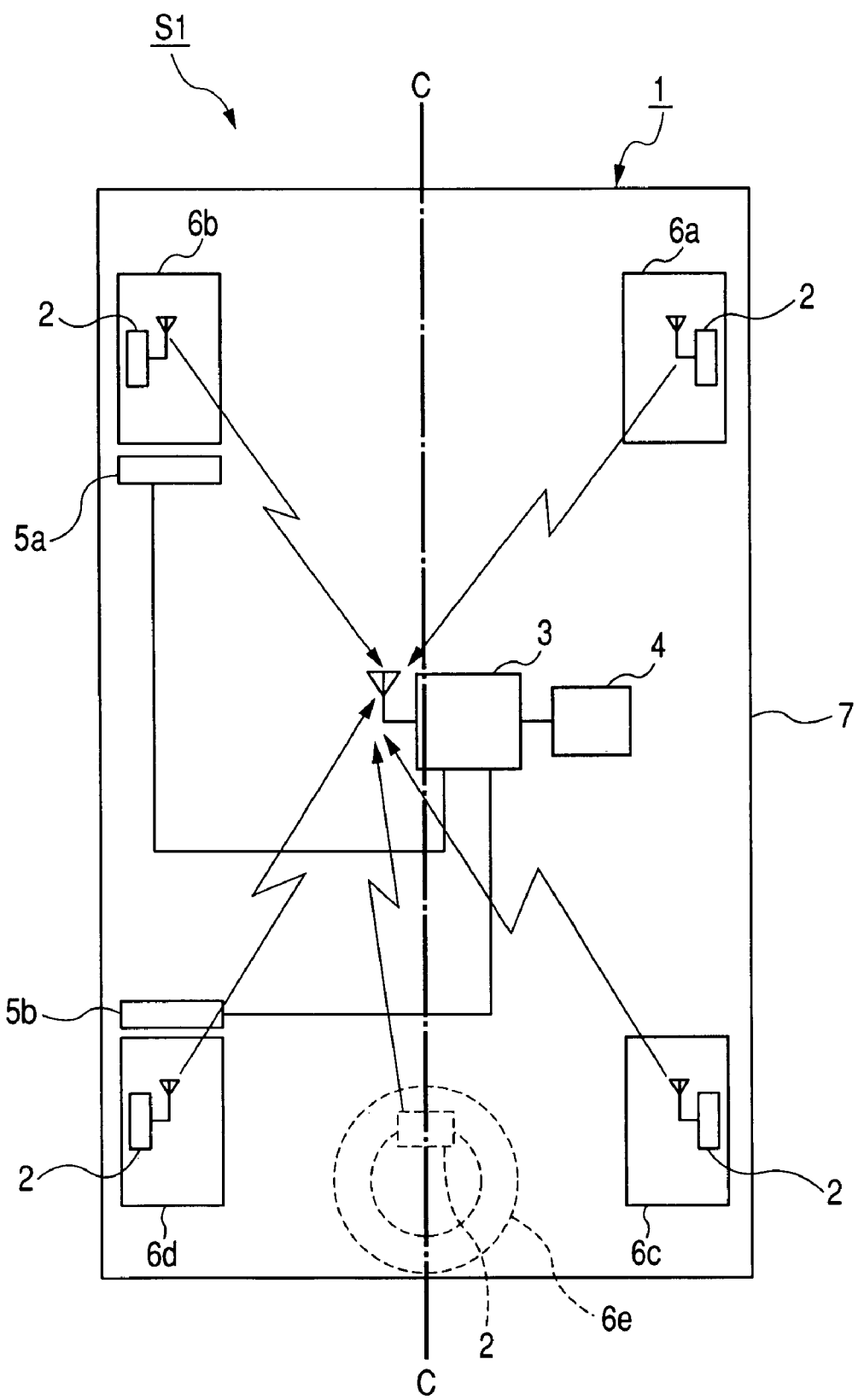

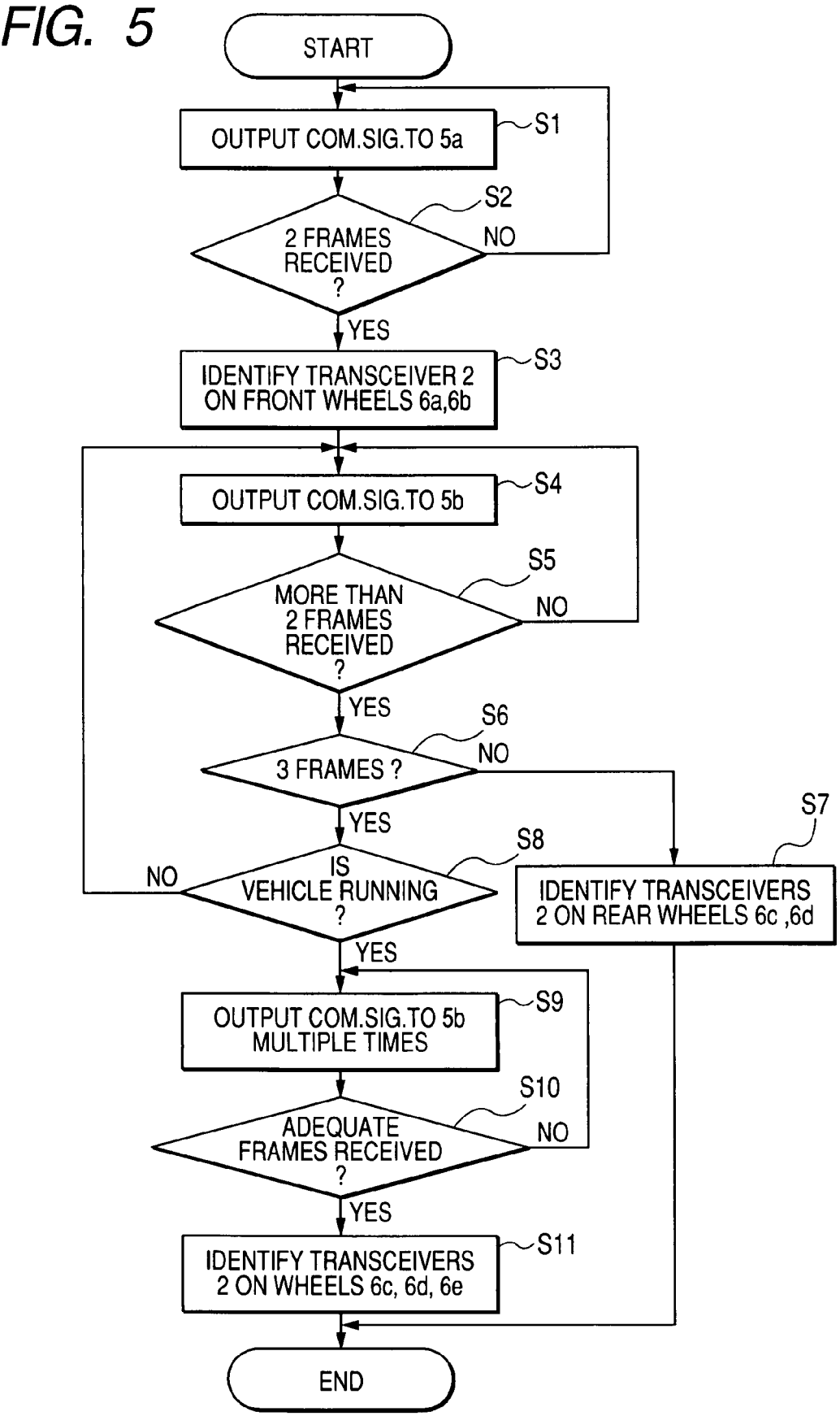

RL WHEEL 6d — LARGE VARIATION

RR WHEEL 6c — SMALL VARIATION

SPARE WHEEL 6e — ZERO VARIATION

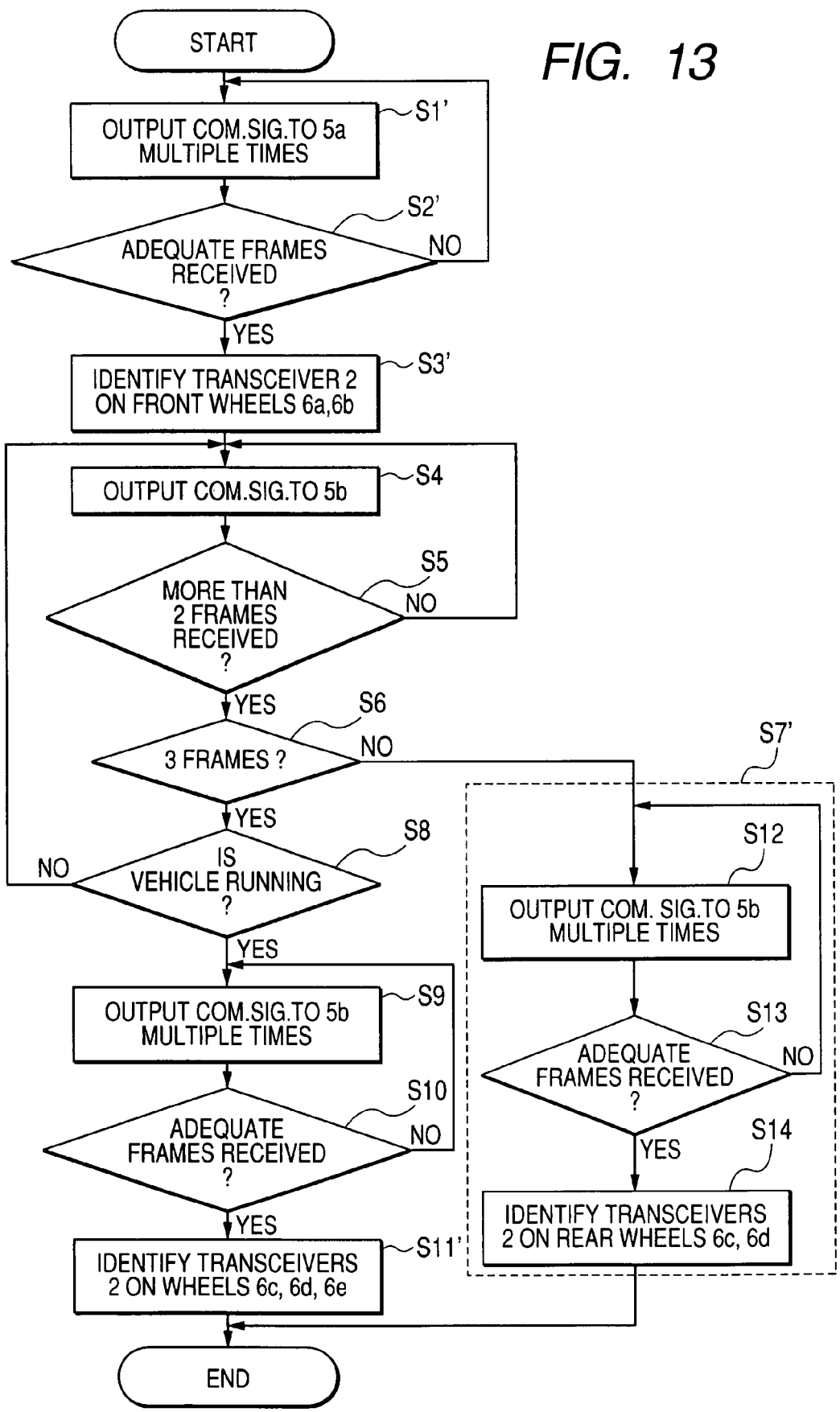

TIRE INFLATION PRESSURE DETECTING APPARATUS WITH FUNCTION OF IDENTIFYING RUNNING AND SPARE WHEELS

CROSS-REFERENCE TO RELATED APPLICATION

This application is based on and claims priority from Japanese Patent Application No. 2006-55793, filed on Mar. 2, 2006, the content of which is hereby incorporated by reference into this application.

BACKGROUND OF THE INVENTION

1. Technical Field of the Invention

The present invention relates generally to tire inflation pressure detecting apparatuses for detecting the inflation pressure of tires on a vehicle and tire location detecting apparatuses for automatically detecting the locations of tires on a vehicle.

More particularly, the invention relates to a direct-type tire inflation pressure detecting apparatus for a vehicle which has a function of identifying running and spare wheels of the vehicle.

2. Description of the Related Art

Conventional direct-type tire inflation pressure detecting apparatuses generally include a plurality of transmitters and a receiver.

Each of the transmitters is directly mounted on one of a plurality of wheels of a vehicle and includes a pressure sensor working to sense the inflation pressure of a tire fitted on the wheel. Each of the transmitters is configured to transmit a pressure signal representative of the inflation pressure of the tire sensed by the pressure sensor.

The receiver is mounted on the body of the vehicle and includes at least one antenna. The receiver is configured to receive the pressure signals transmitted from the transmitters via the antenna and determine the inflation pressure of the tires based on the received pressure signals.

However, in the above arrangement, the receiver may receive, in addition to the pressure signals transmitted by the transmitters, pressure signals transmitted by external transmitters. However, it is impossible for the receiver to determine whether a pressure signal received thereby has been transmitted by one of the transmitters or by an external transmitter. Moreover, it is also impossible for the receiver to detect the locations of the transmitters (or the associated tires) on the vehicle. In other words, the receiver cannot identify the wheel on which the transmitter having transmitted a pressure signal and the tire whose inflation pressure is indicated by the pressure signal are located.

To solve the above problems, as disclosed in U.S. Pat. No. 5,602,524, each of the transmitters may be configured to transmit an identification signal (to be referred to as ID signal hereinafter) representative of the identity thereof along with the pressure signal. On the other hand, the receiver may be configured to have reference ID signals registered therein, each of which coincides with the ID signal of one of the transmitters and is associated with the location of that transmitter.

Thus, the receiver may work to compare an ID signal received thereby with the reference ID signals registered therein and identify the transmitter which has transmitted the ID signal when the ID signal coincides with one of the reference ID signals.

Consequently, the receiver can identify the wheel on which the identified transmitter is mounted. More specifically, the receiver can determine whether the wheel is a FR (front-right), a FL (front-left), a RR (rear-right), or a RL (rear-left) wheel of the vehicle. Further, the receiver can determine the inflation pressure of the tire fitted on the identified wheel based on the pressure signal received along with the ID signal.

However, with such a configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

Conventionally, the registration of the ID signals in the receiver is made through performing a time-consuming manual operation. Thus, it is desired to automatically make the ID registration. Further, for automatically making the ID registration, it is desired to automatically detect the locations of the transmitters (or the associated tires), in other words, to automatically identify the wheel on which each of the transmitters (or the associated tires) is mounted.

Moreover, the vehicle wheels generally include a spare wheel that is located on the body of the vehicle in the vicinity of the rear wheels of the vehicle and also has a transmitter mounted thereon. Thus, in automatic detection of the locations of transmitters on the vehicle, it is difficult for the receiver to determine whether a pressure signal received thereby is transmitted by the transmitter on the spare wheel or by the transmitter on one of the rear wheels of the vehicle. In other words, it is difficult for the receiver to identify whether the wheel on which the transmitter having transmitted the pressure signal is mounted is the spare wheel or one of the rear wheels of the vehicle.

SUMMARY OF THE INVENTION

The present invention has been made in view of the above-mentioned problems.

It is, therefore, an object of the present invention to provide a wheel identifying apparatus which can automatically and accurately identify, for each of the transmitters (or other similar devices), the wheel on which it is located.

It is another object of the present invention to provide a tire inflation pressure detecting apparatus with a function of wheel identification, which can automatically and accurately identify, for each of the transmitters (or other similar devices), the wheel on which it is located without performing the conventional manual operation for ID registration.

It is yet another object of the present invention to provide a wheel identifying apparatus and a tire inflation pressure detecting apparatus with a function of wheel identification, both of which can automatically and accurately identify, for each of the transmitters (or other similar devices), whether it is located on the spare wheel or one of the running wheels of the vehicle.

According to a first aspect of the invention, there is provided a wheel identifying apparatus which includes: a transmitter located on a body of a vehicle and working to transmit a signal during running of the vehicle; a signal strength determiner located on a wheel of the vehicle away from a rotational axis of the wheel, the signal strength determiner working to determine strength of the signal thereat; a variation determiner working to determine a variation in the strength of the signal determined by the signal strength determiner; and a wheel identifier configured to identify the wheel as being located on the body of the vehicle when the variation determined by the variation determiner is substantially zero.

According to a second aspect of the invention, there is provided a wheel identifying apparatus which includes: a triggering device located on a body of a vehicle at different distances from a plurality of running wheels of the vehicle and working to transmit a trigger signal during running of the vehicle; a plurality of transceivers each of which is located on a corresponding one of the running wheels away from a rotational axis of the corresponding running wheel, each of the transceivers being configured to receive the trigger signal, determine strength of the trigger signal thereat, and transmit a response signal containing information indicating the determined strength in response to receipt of the trigger signal; a receiver located on the body of the vehicle and working to receive the response signals transmitted by the transceivers; a variation determiner located on the body of the vehicle and working to determine, for each of the response signals received by the receiver, a variation in the strength of the trigger signal at the transceiver having transmitted the response signal based on the information contained in the response signal, the variations determined for the response signals being to be inversely proportional to the distances from the triggering device to the corresponding running wheels; and a wheel identifier located on the body of the vehicle and working to identify, for each of the response signals received by the receiver, the running wheel on which the transceiver having transmitted the response signal is located through a comparison of the variations determined by the variation determiner.

According to a third aspect of the invention, there is provided a wheel identifying apparatus which includes: a triggering device located on a body of a vehicle at different distances from a plurality of running wheels of the vehicle and working to transmit a trigger signal during running of the vehicle; a plurality of transceivers each of which is located on a corresponding one of the running wheels away from a rotational axis of the corresponding running wheel, each of the transceivers being configured to receive the trigger signal, determine a variation in strength of the trigger signal thereat, and transmit a response signal containing information indicating the determined variation in response to receipt of the trigger signal, the determined variations being to be inversely proportional to the distances from the triggering device to the corresponding running wheels; a receiver located on the body of the vehicle and working to receive the response signals transmitted by the transceivers; and a wheel identifier located on the body of the vehicle and working to identify, for each of the response signals received by the receiver, the running wheel on which the transceiver having transmitted the response signal is located through a comparison of the variations indicated by the information contained in the response signals.

According to a fourth aspect of the invention, there is provided a wheel identifying apparatus for a vehicle, wherein the vehicle includes a plurality of running wheels and a spare wheel located on a body of the vehicle, the wheel identifying apparatus comprising: a triggering device located on the body of the vehicle at different distances from the running wheels of the vehicle and working to transmit a trigger signal during running of the vehicle; a plurality of transceivers each of which is located on a corresponding one of the running and spare wheels away from a rotational axis of the corresponding wheel, each of the transceivers being configured to receive the trigger signal, determine strength of the trigger signal thereat, and transmit a response signal containing information indicating the determined strength in response to receipt of the trigger signal; a receiver located on the body of the vehicle and working to receive the response signals transmitted by the transceivers; a variation determiner located on the body of the vehicle and working to determine, for each of the response signals received by the receiver, a variation in the strength of the trigger signal at the transceiver having transmitted the response signal based on the information contained in the response signal; and a wheel identifier located on the body of the vehicle, the wheel identifier being configured to identify one of the response signals received by the receiver as being transmitted by the transceiver on the spare wheel of the vehicle when the variation determined by the variation determiner for the one of the response signals is substantially zero.

In an embodiment of the invention, after identifying the response signal which has been transmitted by the transceiver on the spare wheel, the wheel identifier further identifies, for each of the remaining response signals, the running wheel on which the transceiver having transmitted the response signal is located through a comparison of the strengths indicated by the information contained in the remaining response signals, the strengths being inversely proportional to the distances from the triggering device to the corresponding running wheels.

In another embodiment of the invention, after identifying the response signal which has been transmitted by the transceiver on the spare wheel of the vehicle, the wheel identifier further identifies, for each of the remaining response signals, the running wheel on which the transceiver having transmitted the response signal is located through a comparison of the variations determined by the variation determiner for the remaining response signals, the variations being inversely proportional to the distances from the triggering device to the corresponding running wheels.

According to a fifth aspect of the invention, there is provided a tire inflation pressure detecting apparatus which includes: a triggering device located on a body of a vehicle at different distances from a plurality of running wheels of the vehicle and working to transmit a trigger signal during running of the vehicle; a plurality of pressure sensors each of which is located on a corresponding one of the running wheels and works to sense inflation pressure of a tire fitted on the corresponding running wheel; a plurality of transceivers each of which is located on a corresponding one of the running wheels away from a rotational axis of the corresponding running wheel, each of the transceivers being configured to receive the trigger signal, determine strength of the trigger signal thereat, and transmit a response signal containing both first and second information in response to receipt of the trigger signal, the first information indicating the inflation pressure of the tire sensed by the corresponding pressure sensor, the second information indicating the strength of the trigger signal determined by the transceiver; a receiver located on the body of the vehicle and working to receive the response signals transmitted by the transceivers; a pressure determiner located on the body of the vehicle and working to determine, for each of the response signals received by the receiver, the inflation pressure of the tire fitted on the corresponding running wheel based on the first information contained in the response signal; a variation determiner located on the body of the vehicle and working to determine, for each of the response signals received by the receiver, a variation in the strength of the trigger signal at the transceiver having transmitted the response signal based on the second information contained in the response signal, the variations determined for the response signals being to be inversely proportional to the distances from the triggering device to the corresponding running wheels; and a wheel identifier located on the body of the vehicle and working to identify, for each of the response signals received by the receiver, the running wheel on which the transceiver having transmitted the response signal is located through a comparison of the variations determined by the variation determiner.

According to a sixth aspect of the present invention, there is provided a tire inflation pressure detecting apparatus which includes: a triggering device located on a body of a vehicle at different distances from a plurality of running wheels of the vehicle and working to transmit a trigger signal during running of the vehicle; a plurality of pressure sensors each of which is located on a corresponding one of the running wheels and works to sense inflation pressure of a tire fitted on the corresponding running wheel; a plurality of transceivers each of which is located on one of the running wheels of the vehicle away from a rotational axis of the running wheel, each of the transceivers being configured to receive the trigger signal, determine a variation in strength of the trigger signal thereat, and transmit a response signal containing both first and second information in response to receipt of the trigger signal, the first information indicating the inflation pressure of the tire sensed by the corresponding pressure sensor, the second information indicating the variation in strength of the trigger signal determined by the transceiver, the determined variations being to be inversely proportional to the distances from the triggering device to the corresponding running wheels; a receiver located on the body of the vehicle and working to receive the response signals transmitted by the transceivers; a pressure determiner located on the body of the vehicle and working to determine, for each of the response signals received by the receiver, the inflation pressure of the tire fitted on the corresponding running wheel based on the first information contained in the response signal; and a wheel identifier located on the body of the vehicle and working to identify, for each of the response signals received by the receiver, the running wheel on which the transceiver having transmitted the response signal is located through a comparison of the variations indicated by the second information in the response signals.

According to a seventh aspect of the present invention, there is provided a tire inflation pressure detecting apparatus for a vehicle, wherein the vehicle includes a plurality of running wheels and a spare wheel located on a body of the vehicle, the tire inflation pressure detecting apparatus comprising: a triggering device located on the body of the vehicle at different distances from the running wheels of the vehicle and working to transmit a trigger signal during running of the vehicle; a plurality of pressure sensors each of which is located on a corresponding one of the running and spare wheels of the vehicle and works to sense inflation pressure of a tire fitted on the corresponding wheel; a plurality of transceivers each of which is located on a corresponding one of the running and spare wheels away from a rotational axis of the corresponding wheel, each of the transceivers being configured to receive the trigger signal, determine strength of the trigger signal thereat, and transmit a response signal containing both first and second information in response to receipt of the trigger signal, the first information indicating the inflation pressure of the tire sensed by the corresponding pressure sensor, the second information indicating the strength of the trigger signal determined by the transceiver; a receiver located on the body of the vehicle and working to receive the response signals transmitted by the transceivers; a pressure determiner located on the body of the vehicle and working to determine, for each of the response signals received by the receiver, the inflation pressure of the tire fitted on the corresponding wheel based on the first information contained in the response signal; a variation determiner located on the body of the vehicle and working to determine, for each of the response signals received by the receiver, a variation in the strength of the trigger signal at the transceiver having transmitted the response signal based on the second information contained in the response signal; and a wheel identifier located on the body of the vehicle, the wheel identifier being configured to identify one of the response signals received by the receiver as being transmitted by the transceiver on the spare wheel when the variation determined by the variation determiner for the one of the response signals is substantially zero.

In an embodiment of the invention, after identifying the response signal which has been transmitted by the transceiver on the spare wheel, the wheel identifier further identifies, for each of the remaining response signals, the running wheel on which the transceiver having transmitted the response signal is located through a comparison of the strengths indicated by the second information contained in the remaining response signals, the strengths being inversely proportional to the distances from the triggering device to the corresponding running wheels.

In another embodiment of the invention, after identifying the response signal which has been transmitted by the transceiver on the spare wheel, the wheel identifier further identifies, for each of the remaining response signals, the running wheel on which the transceiver having transmitted the response signal is located through a comparison of the variations determined by the variation determiner for the remaining response signals, the variations being inversely proportional to the distances from the triggering device to the corresponding running wheels.

Consequently, through providing the above wheel identifying apparatuses and the tire inflation pressure detecting apparatuses, the objects of the present invention are achieved.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 1 is a schematic view showing the overall configuration of a tire inflation pressure detecting apparatus according to the first embodiment of the invention;

FIG. 5 is a flow chart showing a process of the receiver in an "ID registration mode" of the tire inflation pressure detecting apparatus;

FIG. 13 is a flow chart showing a process of the receiver in the ID registration mode according to the second embodiment of the invention.

DESCRIPTION OF THE PREFERRED EMBODIMENTS

Figure 2A:
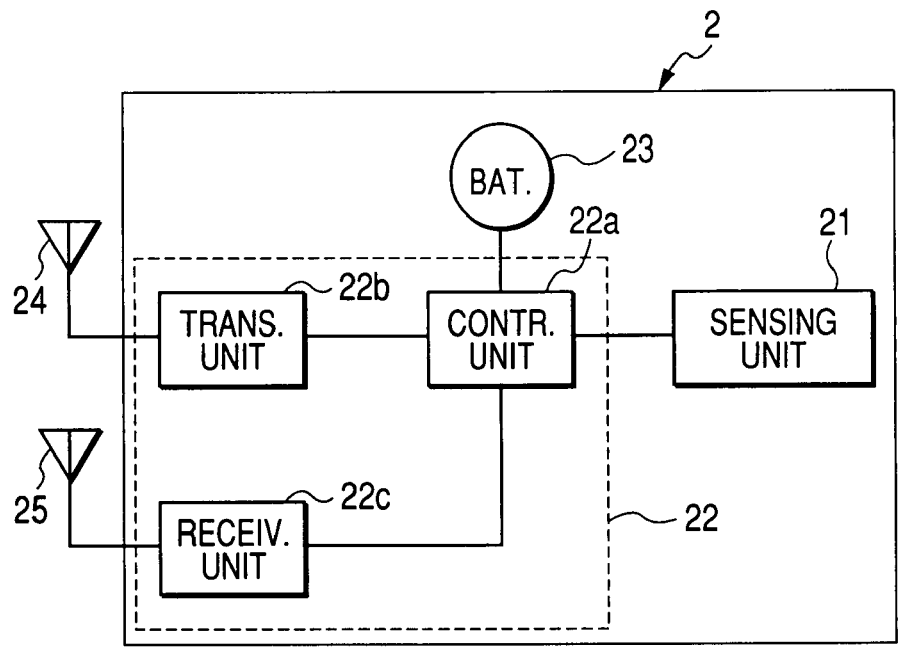
FIG. 2A is a functional block diagram showing the configuration of each of transceivers of the tire inflation pressure detecting apparatus.

The preferred embodiments of the present invention will be described hereinafter with reference to FIGS. 1-13.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure detecting apparatus S1 according to the first embodiment of the invention.

The tire inflation pressure detecting apparatus S1 is installed to a vehicle 1 which includes four running wheels 6a-6d (i.e., the FR wheel 6a, the FL wheel 6b, the RR wheel 6c, and the RL wheel 6d) and a spare wheel 6e that is disposed in the rear trunk of the vehicle 1.

As shown in FIG. 1, the tire inflation pressure detecting apparatus S1 includes five transceivers 2, a receiver 3, a warning device 4, and two triggering devices 5a and 5b.

Each of the transceivers 2 is mounted on one of the five wheels 6a-6e of the vehicle 1, so as to have association with a tire fitted on the one of the wheels 6a-6e.

Each transceiver 2 works to sense the inflation pressure of the associated tire and transmit a frame that contains tire pressure information indicative of the sensed inflation pressure of the associated tire.

Referring to FIG. 2A, each transceiver 2 is configured with a sensing unit 21, a microcomputer 22, a battery 23, a transmitting antenna 24, and a receiving antenna 25.

The sensing unit 21 is configured with sensors, such as a diaphragm-type pressure sensor and a temperature sensor, and works to output signals representative of the sensed inflation pressure of the tire and the sensed temperature of air within the tire.

The microcomputer 22 is of a well-known type and functionally includes a controlling unit 22a, a transmitting unit 22b, and a receiving unit 22c. The microcomputer 22 is configured to implement predetermined processes in accordance with a program installed in a memory (not shown) of the controlling unit 22a.

The controlling unit 22a works to receive the signals outputted from the sensing unit 21 and process those signals as needed. The controlling unit 22a also works to assemble the frame, which contains the tire pressure information indicative of the inflation pressure of the tire sensed by the sensing unit 21, and provide the frame to the transmitting unit 22b.

Further, the controlling unit 22a works to receive, via the receiving antenna 25 and the receiving unit 22c, a trigger signal transmitted by one of the triggering devices 5a and 5b and determine the strength of the received trigger signal through signal processing thereof. The controlling unit 22a also works to store, in the frame or another frame, signal strength information indicative of the determined strength.

Furthermore, the controlling unit 22a works to control the transmitting unit 22b to transmit the frame.

The transmitting unit 22b works to transmit, via the transmitting antenna 24, the frame provided by the controlling unit 22a to the receiver 3 at a radio frequency of, for example, 310 MHz.

The receiving unit 22c works to receive, via the receiving antenna 25, the trigger signal transmitted by the one of the triggering devices 5a and 5b and provide the received trigger signal to the controlling unit 22a.

The battery 23 is provided to supply electrical power necessary for operation of the transceiver 2.

The above-described transceivers 2 each are fixed to an air valve of the associated one of the wheels 6a-6e and at least the sensing unit 21 thereof is arranged to be exposed to the air within the tire on the associated wheel.

On the other hand, the receiver 3 is mounted on the body 7 of the vehicle 1. The receiver 3 works to receive all the frames transmitted by the transceivers 2 and determine the inflation pressure of the associated tires based on the tire pressure information contained in the received frames. The receiver 3 also works to identify, for each of the received frames, the wheel on which the transceiver 2 having transmitted the frame is mounted.

Figure 2B:
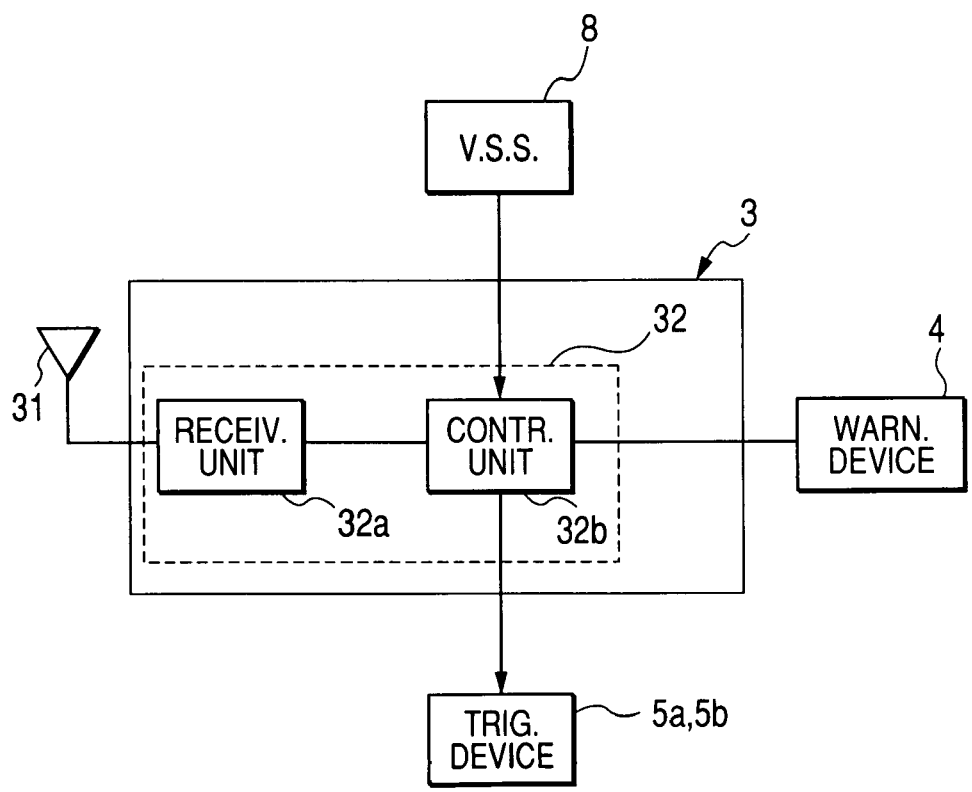
FIG. 2B is a functional block diagram showing the configuration of a receiver of the tire inflation pressure detecting apparatus.

Referring to FIG. 2B, the receiver 3 is configured with a receiving antenna 31 and a microcomputer 32.

The receiving antenna 31 is fixed to the body 7 of the vehicle 1 to receive, as illustrated in FIG. 1, all the frames transmitted by the transceivers 2.

The microcomputer 32 is of a well-known type and functionally includes a receiving unit 32a and a controlling unit 32b. The microcomputer 32 is configured to implement predetermined processes in accordance with a program installed in a memory (not shown) of the controlling unit 32b.

The receiving unit 32a works to receive, via the receiving antenna 31, all the frames transmitted by the transceivers 2 and provide the received frames to the controlling unit 32b.

The controlling unit 32b works to output a command signal to each of the triggering devices 5a and 5b, thereby causing them to transmit the trigger signal. The controlling unit 32b also works to identify, for each of the frames received from the receiving unit 32a, the wheel on which the transceiver 2 having transmitted the frame is mounted. In addition, the controlling unit 32b receives vehicle speed information from a vehicle speed sensor 8 and utilizes the vehicle speed information for the wheel identification.

The controlling unit 32b further works to determine, for each of the frames received from the receiving unit 32a, the inflation pressure of the tire that is located on the same wheel as the transceiver 2 having transmitted the frame based on the tire pressure information contained in the frame.

Thus, both the inflation pressure and location of each of the tires can be determined by the controlling unit 32b. When the determined inflation pressure of any of the tires is decreased below a predetermined threshold Th, the controlling unit 32b outputs a warning signal indicating both the inflation pressure and location of the flattened tire.

The warning device 4 is, as illustrated in FIG. 1, electrically connected to the receiver 3 and arranged in a location visible for the driver of the vehicle 1. The warning device 4 is configured with, for example, a warning display on the instrument panel of the vehicle 1. The warning device 4 works to inform, in response to receipt of the warning signal from the receiver 3, the driver of both the inflation pressure and location of the flattened tire.

Each of the triggering devices 5a and 5b works to transmit, in response to receipt of the command signal from the controlling unit 32b of the receiver 3, the trigger signal at a low frequency of, for example, 134 kHz.

In addition, in the present embodiment, more than one triggering device is employed in consideration of the fact that the output strength of the trigger signal is limited by regulations. More specifically, if only a single triggering device is employed to transmit the trigger signal at a limited strength, some of the transceivers 2 might be unable to detect the trigger signal.

In the present embodiment, as illustrated in FIG. 1, the triggering device 5a is mounted on the body 7 of the vehicle 1 closer to the front wheels 6a and 6b than the rear wheels 6c and 6d, while the triggering device 5b is mounted on the body 7 of the vehicle 1 closer to the rear wheels 6c and 6d than the front wheels 6a and 6b.

Consequently, when the triggering device 5a transmits the trigger signal at a predetermined strength, only the front wheels 6a and 6b can detect the trigger signal. Similarly, when the triggering device 5b transmits the trigger signal at the predetermined strength, only the rear and spare wheels 6c-6e can detect the trigger signal.

Further, in the present embodiment, the triggering device 5a is arranged in close vicinity to the FL wheel 6b, while the triggering device 5b is arranged in close vicinity to the RL wheel 6d. In other words, both the triggering devices 5a and 5b are located on the left side of the centerline C-C extending in the longitudinal direction of the vehicle 1.

Consequently, the triggering device 5a is closer to the FL wheel 6b than the FR wheel 6a. Similarly, the distance from the triggering device 5b decreases in the order of the RL wheel 6d, the spare wheel 6e, and the RR wheel 6c.

In addition, it is preferable for the triggering devices 5a and 5b to be disposed so that no metal members cover them and they can be prevented from foreign matters, such as water and stones, during running of the vehicle 1. For example, the triggering devices 5a and 5b may be disposed in the compartment of the vehicle 1.

After having described the overall configuration of the tire inflation pressure detecting apparatus S1, a wheel identification method according to the present embodiment will be described hereinafter.

Figure 3:
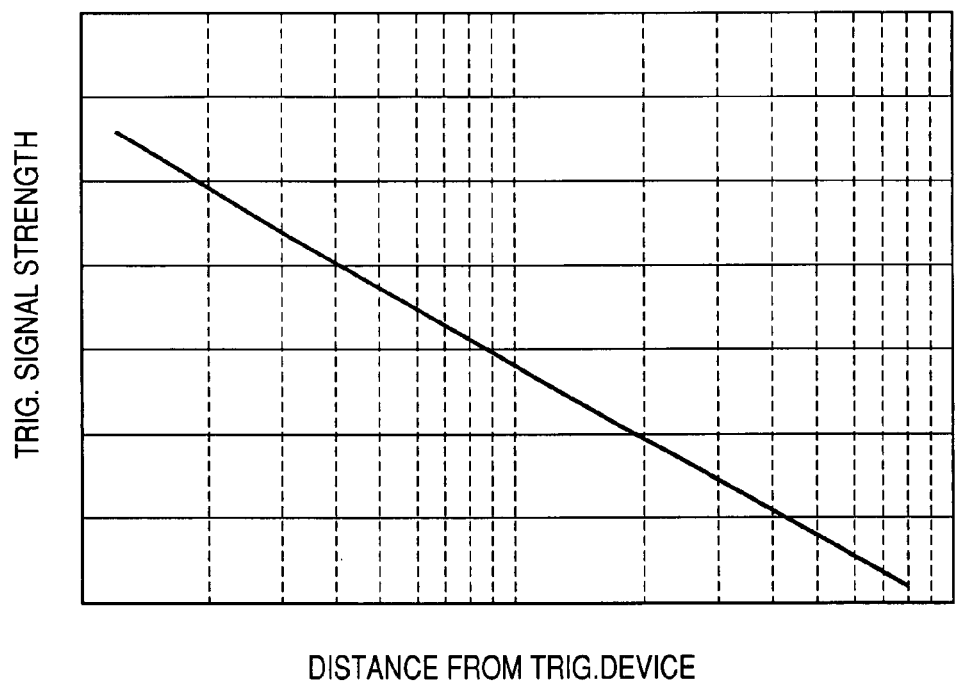
FIG. 3 is a graphical representation showing the relationship between strength of a trigger signal and distance from a triggering device transmitting the trigger signal.

FIG. 3 shows the relationship between strength of the trigger signal and distance from the triggering device 5a or 5b transmitting the trigger signal.

As shown in FIG. 3, strength of the trigger signal attenuates with increase in distance from the triggering device 5a or 5b. In other words, strength of the trigger signal is inversely proportional to distance from the triggering device 5a or 5b.

In the present embodiment, since the triggering device 5a is closer to the FL wheel 6b than the FR wheel 6a, strength of the trigger signal transmitted by the triggering device 5a is higher at the transceiver 2 on the FL wheel 6b than at the transceiver 2 on the FR wheel 6a.

Accordingly, it is possible to identify, for each of the transceivers 2 on the front wheels 6a and 6b, whether it is mounted on the FR wheel 6a or the FL wheel 6b through a comparison between the strengths of the trigger signal thereat.

Similarly, since the triggering device 5b is closer to the RL wheel 6d than the RR wheel 6c, strength of the trigger signal transmitted by the triggering device 5b is higher at the transceiver 2 on the RL wheel 6d than at the transceiver 2 on the RR wheel 6c.

Accordingly, it is possible to identify, for each of the transceivers 2 on the rear wheels 6c and 6d, whether it is mounted on the RR wheel 6c or the RL wheel 6d through a comparison between the strengths of the trigger signal thereat.

Figure 4A:
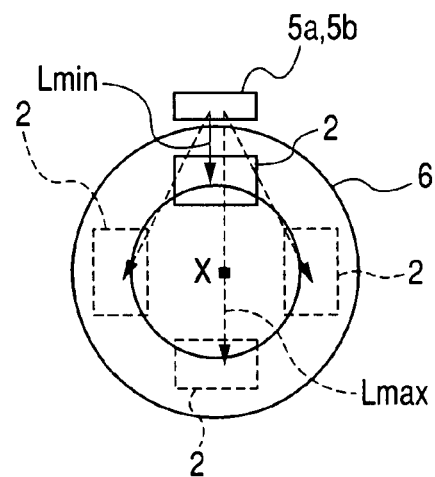
FIG. 4A is a schematic view illustrating change in the distance between a triggering device and a transceiver mounted on a vehicle wheel during rotation of the wheel.

Referring further to FIG. 4A, in the present embodiment, each of the transceivers 2 is mounted on the corresponding one of the wheels 6a-6e away from the rotational axis X of the corresponding wheel.

Consequently, during running of the vehicle 1, each of the transceivers 2 on the running wheels 6a-6d rotates around the rotational axis X of the corresponding wheel. Thus, the distance from each of the transceivers 2 on the running wheels 6a-6d to the corresponding (i.e., the closer) triggering device 5a or 5b varies in the range from a minimum distance Lmin to a maximum distance Lmax.

Figure 4B:
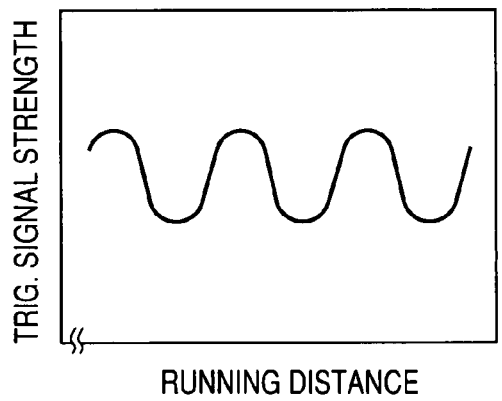
FIG. 4B is a graphical representation illustrating change in the strength of the trigger signal at the transceiver during rotation of the wheel.

Accordingly, as shown in FIG. 4B, the strength of the trigger signal at each of the transceivers 2 on the running wheels 6a-6d varies with running of the vehicle 1 when the corresponding triggering device 5a or 5b constantly transmits the trigger signal.

In contrast, the spare wheel 6e remains stationary during running of the vehicle 1, and thus the distance from the transceiver 2 on the spare wheel 6e to the triggering device 5b is always constant.

Accordingly, strength of the trigger signal transmitted by the triggering device 5b is constant at the transceiver 2 on the spare wheel 6e. In other words, the variation in the strength of the trigger signal at the transceiver 2 on the spare wheel 6e is zero during running of the vehicle 1.

Thus, it is possible to identify, for each of the transceivers 2, whether it is mounted on the spare wheel 6e through checking if the variation in the strength of the trigger signal thereat is zero during running of the vehicle 1.

According to the present embodiment, the tire inflation pressure detecting apparatus S1 has two different operation modes. The first mode is "ID registration mode" and the second one is "tire pressure detection mode". The tire inflation pressure detecting apparatus S1 is configured to operate in the ID registration mode first and then in the tire pressure detection mode.

Specifically, when an ignition switch (not shown) of the vehicle 1 is turned from off to on, the receiver 3 and the triggering devices 5a and 5b are supplied with electric power from a battery (not shown) on the vehicle 1, thus entering the ID registration mode.

FIG. 5 shows a process of the controlling unit 32b of the receiver 3 in the ID registration mode.

First, at the step S1, the controlling unit 32b outputs the command signal to the triggering device 5a after a predetermined time from being supplied with electric power.

Figure 6:
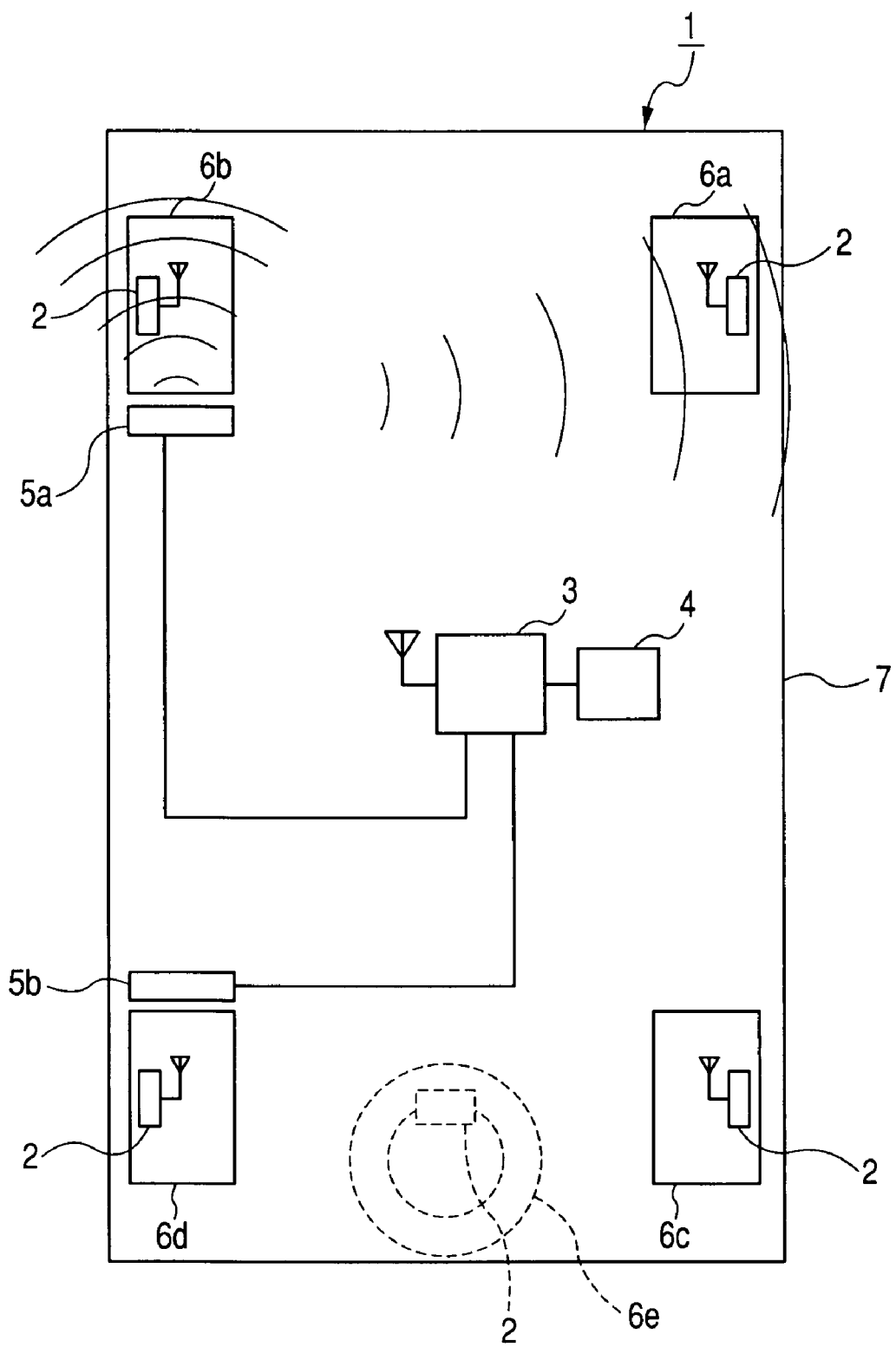
FIG. 6 is a schematic view illustrating transmission of the trigger signal from a front-side triggering device to the transceivers on the front wheels of the vehicle.

In response to receipt of the command signal, the triggering device 5a transmits the trigger signal at the predetermined strength to the transceivers 2 on the front wheels 6a and 6b, as illustrated in FIG. 6.

Figure 7:
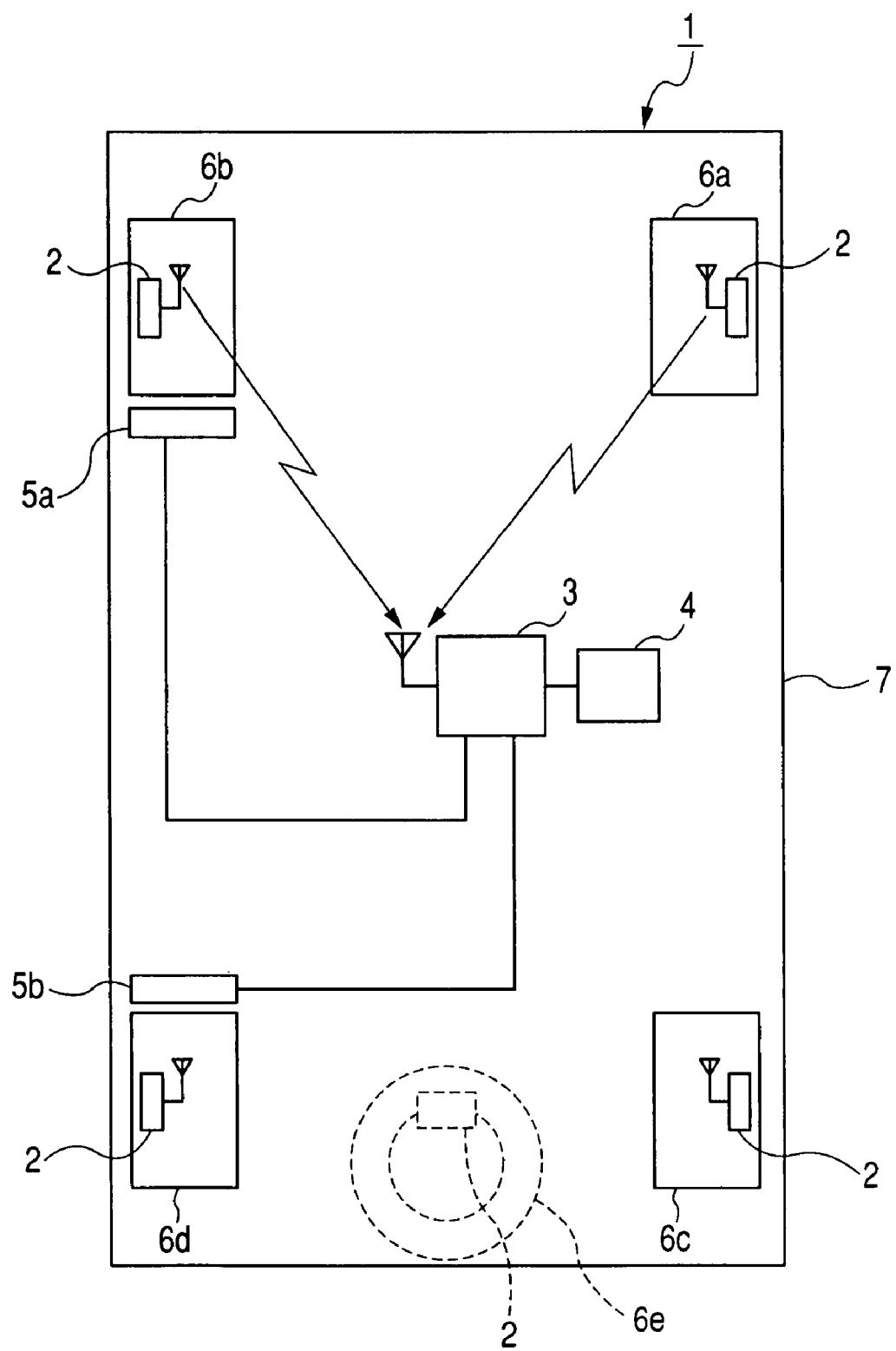
FIG. 7 is a schematic view illustrating transmission of frames from the transceivers on the front wheels of the vehicle to the front-side triggering device.

Upon receiving the trigger signal via the receiving antenna 25 and the receiving unit 22c, the controlling unit 22a of each of the transceivers 2 on the front wheels 6a and 6b is activated to determine the strength of the received trigger signal. Then, the controlling unit 22a stores in the frame the signal strength information indicative of the determined strength and ID information indicative of the identity of the transceiver 2. After that, the controlling unit 22a sets a waiting time and controls the transmitting unit 22b to transmit, after elapse of the set waiting time from receipt of the trigger signal, the frame to the receiver 3, as illustrated in FIG. 7.

In addition, the waiting time is so set as to allow the transceivers 2 to transmit the respective frames at different time, thereby avoiding interference of the frames at the receiver 3. More specifically, in the present embodiment, the waiting time is set according to the determined strength of the trigger signal at the transceiver 2.

At the step S2, the controlling unit 32b of the receiver 3 determines whether two frames from different transceivers 2 received thereby after a predetermined time from outputting the command signal to the triggering device 5a.

If the determination at the step S2 produces a "NO" answer, then the process returns to the step S1.

Otherwise, if the determination at the step S2 produces a "YES" answer, then the process proceeds to the step S3.

At the step S3, the controlling unit 32b identifies, for each of the two received frames, whether the wheel on which the transceiver 2 having transmitted the frame is mounted is the FR wheel 6a or the FL wheel 6b.

More specifically, the controlling unit 32b retrieves the signal strength information and ID information from the frames. Then, the controlling unit 32b compares the strengths indicated by the signal strength information contained in the frames. Based on the comparison, the controlling unit 32b identifies the transceiver 2 which has transmitted the frame containing the signal strength information indicative of the higher strength as being mounted on the FL wheel 6b and the other as being mounted on the FR wheel 6a.

After the wheel identification, the controlling unit 32b registers in the memory thereof the ID information of each of the transceivers 2 on the front wheels 6a and 6b as reference ID information associated with the corresponding identified one of the wheels 6a and 6b.

At the step S4, the controlling unit 32b outputs the command signal to the triggering device 5b.

Figure 8:
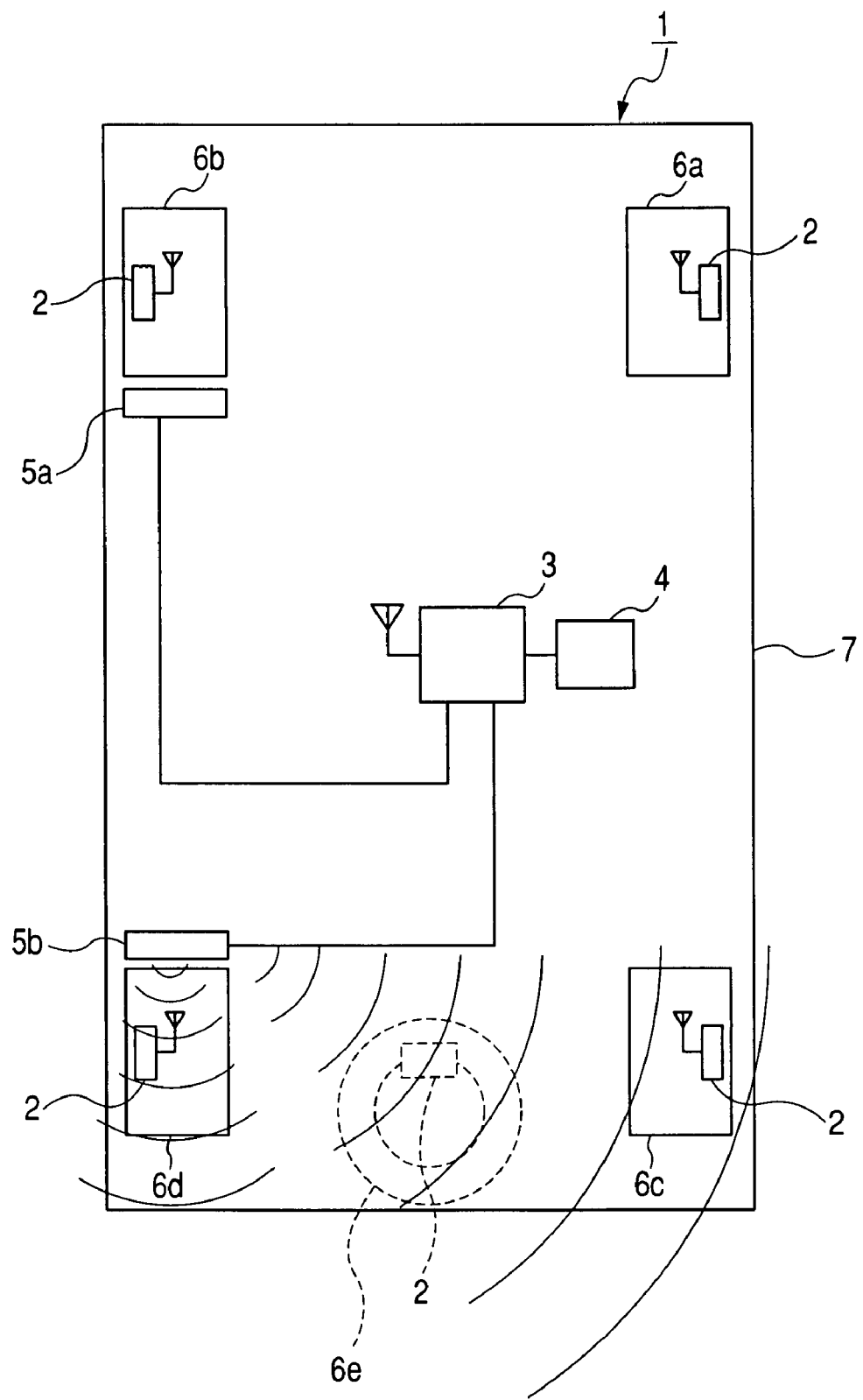
FIG. 8 is a schematic view illustrating transmission of the trigger signal from a rear-side triggering device to the transceivers on the rear and spare wheels of the vehicle.

In response to receipt of the command signal, the triggering device 5b transmits the trigger signal at the predetermined strength to the transceivers 2 on the rear and spare wheels 6c-6e, as illustrated in FIG. 8.

Figure 9:
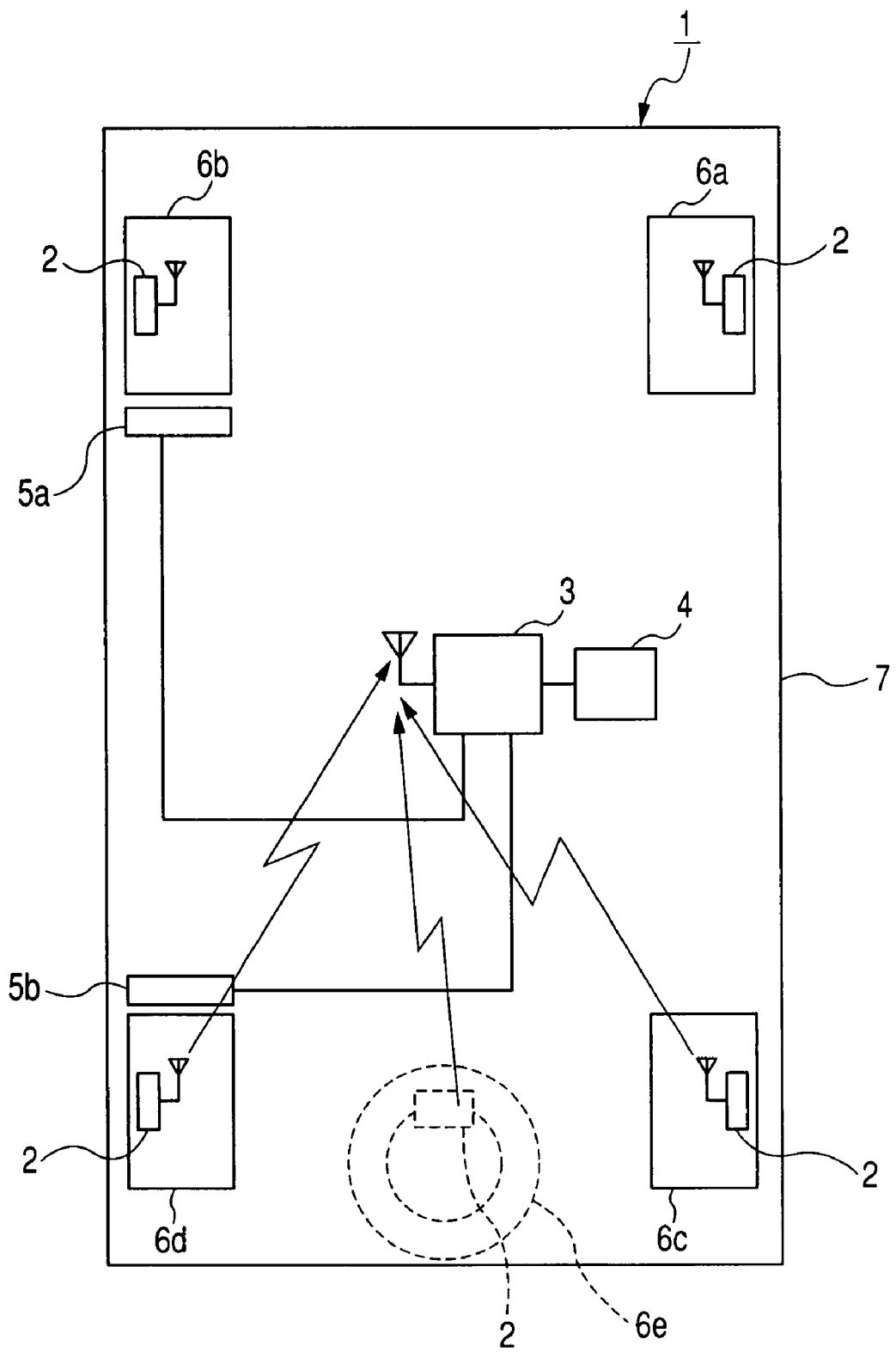
FIG. 9 is a schematic view illustrating transmission of frames from the transceivers on the rear and spare wheels of the vehicle to the rear-side triggering device.
Figure 10:
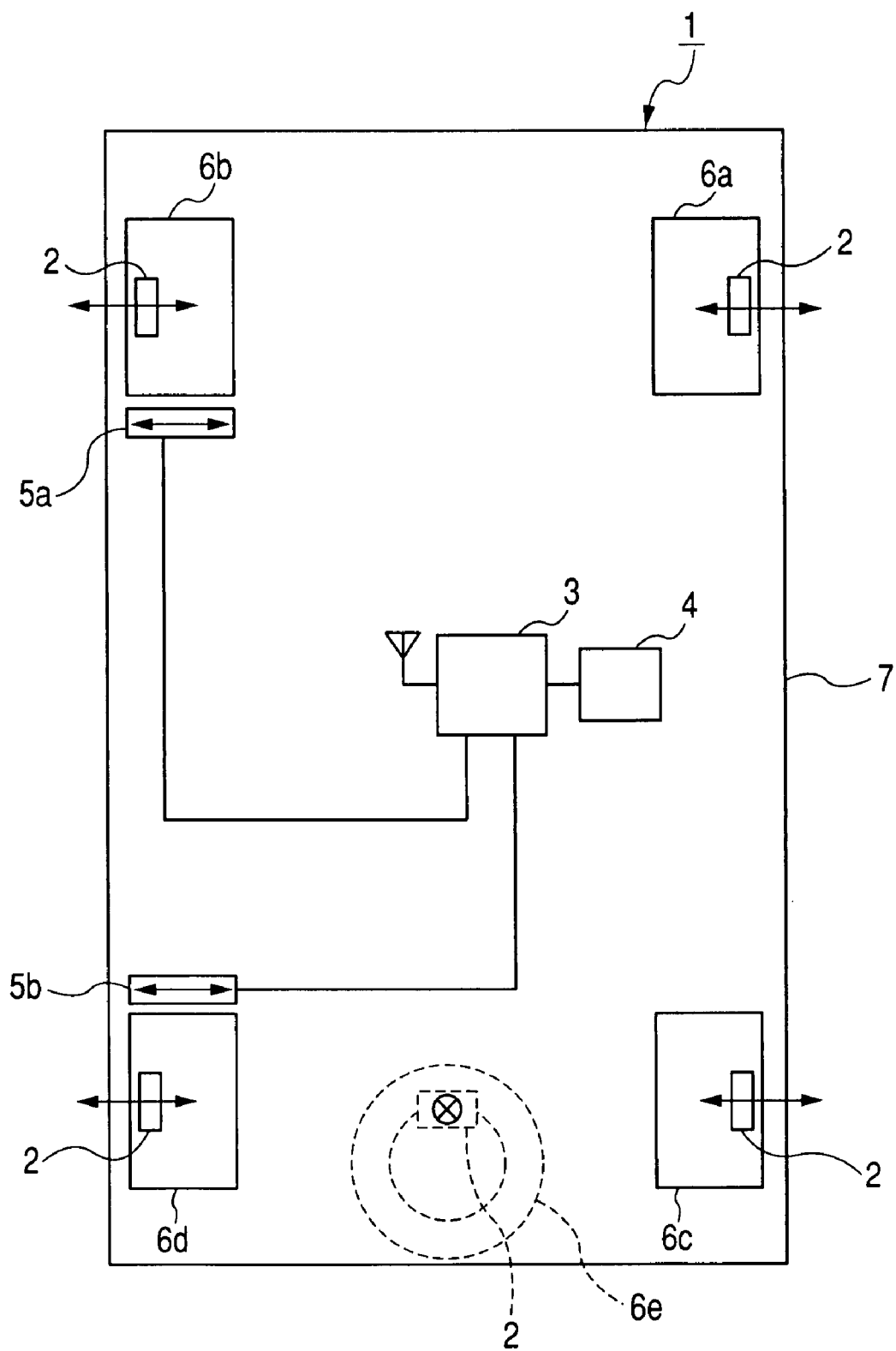
FIG. 10 is a schematic view illustrating orientations of the transmitting antennas of the triggering devices and those of the receiving antennas of the transceivers.

Upon receiving the trigger signal via the receiving antenna 25 and the receiving unit 22c, the controlling unit 22a of each of the transceivers 2 on the rear and spare wheels 6c-6e is activated to determine the strength of the received trigger signal. Then, the controlling unit 22a stores in the frame the signal strength information indicative of the determined strength and ID information indicative of the identity of the transceiver 2. After that, the controlling unit 22a sets a waiting time and controls the transmitting unit 22b to transmit, after elapse of the set waiting time from receipt of the trigger signal, the frame to the receiver 3, as illustrated in FIG. 9.

However, in some cases, the transceiver 2 on the spare wheel 6e may be unable to receive the trigger signal depending on the arrangement of the spare wheel 6e. For example, in FIG. 10, the axes of the receiving antennas 25 of the transceivers 2 on the front and rear wheels 6a-6d and the axes of transmitting antennas of the triggering devices 5a and 5b are all parallel to the lateral direction of the vehicle 1; in other words, all the axes are parallel to each other. In contrast, the axis of the receiving antenna 25 of the transceiver 2 on the spare wheel 6e is perpendicular to the ground; in other words, the axis is perpendicular to the axis of the transmitting antenna of the triggering device 5b. In such a case, the transceiver 2 on the spare wheel 6e may be unable to receive the trigger signal transmitted by the triggering device 5b.

In consideration of the above, the controlling unit 32b of the receiver 3 makes a determination, at the step S5, as to whether more than two frames from different transceivers 2 are received thereby after a predetermined time from outputting the command signal to the triggering device 5b.

If the determination at the step S5 produces a "NO" answer, then the process returns to the step S4.

Otherwise, if the determination at the step S5 produces a "YES" answer, then the process proceeds to the step S6.

At the step S6, the controlling unit 32b makes a further determination as to whether the number of the received frames is three.

If the determination at the step S6 produces a "NO" answer (in other words, if the number of the received frames is two), then the process proceeds to the step S7.

At the step S7, the controlling unit 32b identifies, for each of the two received frames, whether the wheel on which the transceiver 2 having transmitted the frame is mounted is the RR wheel 6c or the RL wheel 6d.

More specifically, the controlling unit 32b retrieves the signal strength information and ID information from the frames. Then, the controlling unit 32b compares the strengths indicated by the signal strength information contained in the frames. Based on the comparison, the controlling unit 32b identifies the transceiver 2 which has transmitted the frame containing the signal strength information indicative of the higher strength as being mounted on the RL wheel 6d and the other as being mounted on the RR wheel 6c.

After the wheel identification, the controlling unit 32b registers in the memory thereof the ID information of each of the transceivers 2 on the rear wheels 6c and 6d as reference ID information associated with the corresponding identified one of the wheels 6c and 6d.

Otherwise, if the determination at the step S6 produces a "YES" answer, then the process proceeds to the step S8.

At the step S8, the controlling unit 32b determines whether the vehicle 1 is running based on the vehicle speed information from the vehicle speed sensor 8.

If the determination at the step S8 produces a "NO" answer, then the process returns to the step S4.

Otherwise, if the determination at the step S8 produces a "YES" answer, then the process proceeds to the step S9.

At the step S9, the controlling unit 32b outputs the command signal to the triggering device 5b a plurality of times at predetermined intervals, so that the triggering device 5b transmits the trigger signal the plurality of times at the predetermined intervals.

In the present embodiment, the intervals for transmitting the trigger signal are so predetermined that each of the transceivers 2 receives the trigger signal at a plurality of different angular positions thereof with respect to the rotational axis X of the corresponding wheel. Consequently, a non-zero variation in the strength of the trigger signal can be obtained at each of the transceivers 2 on the rear wheels 6c and 6d, while a zero variation in the strength of the trigger signal is obtainable at the transceiver 2 on the spare wheel 6e.

In addition, the controlling unit 32b may set the intervals based on the vehicle speed information from the vehicle speed sensor 8 and the diameter of the wheels 6c-6e to achieve the above effect.

At the step S10, the controlling unit 32b determines whether an adequate number of frames from three transceivers 2 are received thereby. The adequate number of frames is necessary for determining the variations in the strengths of the trigger signal at the rear and spare wheels 6c-6e.

If the determination at the step S10 produces a "NO" answer, then the process returns to the step S9.

Otherwise, if the determination at the step S10 produces a "YES" answer, then the process proceeds to the step S11.

At the step S11, the controlling unit 32b identifies, for each of the three transceivers 2, the one of the rear and spare wheels 6c-6e on which it is mounted.

More specifically, the controlling unit 32b retrieves the signal strength information and ID information from the received frames. Then, the controlling unit 32b classifies the received frames into three different groups so that the members of the same group contain the same ID information. Further, the controlling unit 32b determines, for each of the three groups, an average strength of the trigger signal at the corresponding transceiver 2 whose ID information is contained in the frames of the group. Thereafter, the controlling unit 32b compares the determined average strengths, and identifies the transceiver 2 which has transmitted the group of frames resulting in the maximum average strength as being mounted on the RL wheel 6d.

Next, the controlling unit 32b determines, for each of the remaining two groups, the variation in the strength of the trigger signal at the corresponding transceiver 2 based on the signal strength information contained in the frames of the group. In the present embodiment, the variation is determined as the difference between a maximum and a minimum value of the strength at the corresponding transceiver 2.

Figure 11A:
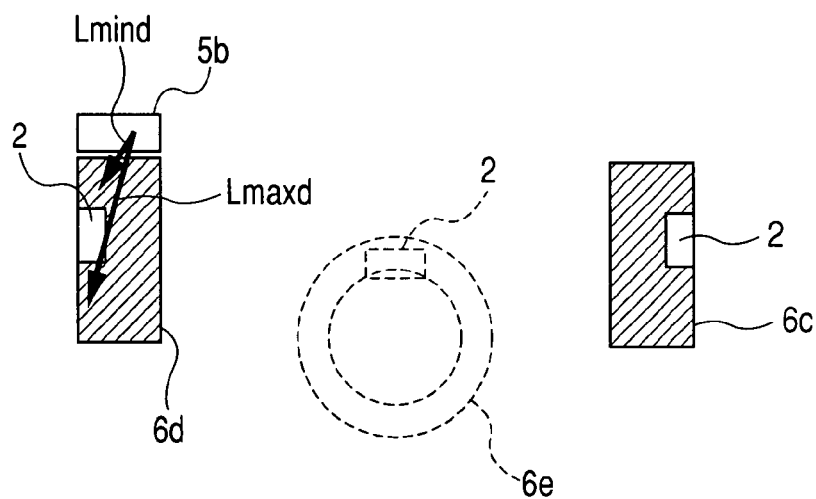
FIG. 11A is a schematic view illustrating variation in the distance between the rear-side triggering device and the transceiver on the RL wheel of the vehicle.

Referring to FIG. 11A, the distance between the triggering device 5b and the transceiver 2 on the RL wheel 6d varies in the range from a minimum distance Lmind to a maximum distance Lmaxd during running of the vehicle 1. Similarly, the distance between the triggering device 5b and the transceiver 2 on the RR wheel 6c varies in the range from a minimum distance Lminc to a maximum distance Lmaxc during running of the vehicle 1. In contrast, the distance between the triggering device 5b and the transceiver 2 on the spare wheel 6e keeps constant during running of the vehicle 1.

Figure 12A:
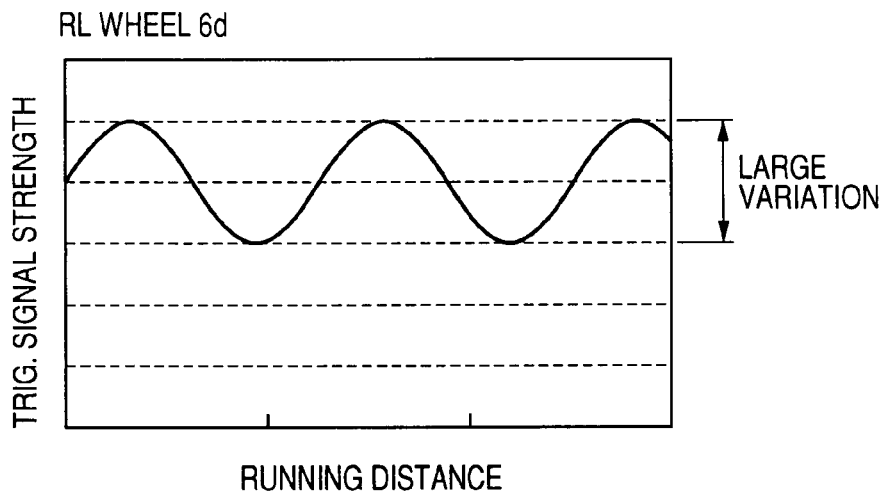
FIGS. 12A-12C are graphical representations respectively illustrating variations in the strengths of the trigger signal at the transceivers on the RL, RR, and spare wheel of the vehicle.
Figure 12B:
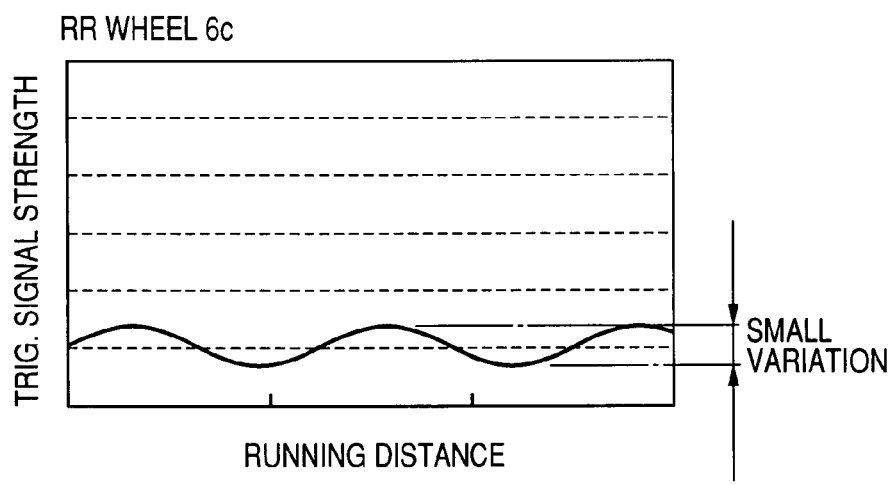
Figure 12C:
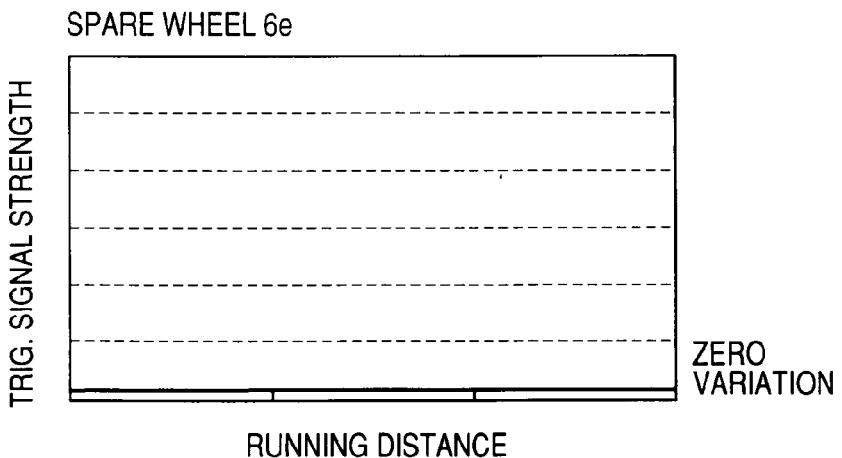

Consequently, as shown in FIGS. 12A and 12B, both the strengths of the trigger signal at the rear wheels 6d and 6c vary during running of the vehicle 1. In contrast, as shown in FIG. 12C, the variation in the strength of the trigger signal at the transceiver 2 on the spare wheel 6e is zero.

Accordingly, in the present embodiment, the controlling unit 32b of the receiver 3 identifies the transceiver 2 which has transmitted the group of frames resulting in the zero variation in the strength of the trigger signal as being mounted on the spare wheel 6e and the other as being mounted on the RR wheel 6c.

After the wheel identification, the controlling unit 32b registers in the memory thereof the ID information of each of the transceivers 2 on the rear and spare wheels 6c-6e as reference ID information associated with the corresponding identified one of the wheels 6c-6e.

In addition, in practical use, the variation in the strength of the trigger signal at the transceiver 2 on the spare wheel 6e may not be absolutely zero due to various noises. Therefore, the "zero variation" here includes a substantially zero variation that is considerably less than the variation in the strength of the trigger signal at the transceiver 2 on the RR wheel 6c.

Moreover, in the present embodiment, the wheel identification for the transceivers 2 on the RR wheel 6c and the spare wheel 6e is made based on the comparison of the variations, not based on the comparison of the strengths for the following reasons.

Referring again to FIG. 10, when the axis of the transceiver 2 on the spare wheel 6e is perpendicular to the axis of the transmitting antenna of the triggering device 5b, the strength of the trigger signal at the transceiver 2 on the spare wheel 6e may be almost the same as that at the transceiver 2 on the RR wheel 6c, though the transceiver 2 on the spare wheel 6e is closer to the triggering device 5b than the transceiver 2 on the RR wheel 6c. In such a case, it is difficult to make the wheel identification for the transceivers 2 on the RR wheel 6c and the spare wheel 6e based on the comparison of the strengths of the trigger signal thereat.

As above, the wheel identification and ID registration are made for all of the transceivers 2 on the running and spare wheels 6a-6e. Then, the operation of the tire inflation pressure detecting apparatus S1 is shifted from the ID registration mode to the tire pressure detection mode.

In the tire pressure detection mode, the controlling unit 22a of each of the transceivers 2 receives the signals outputted from the sensing unit 21 and processes those signals. Then, the controlling unit 22a stores in the frame the tire pressure information indicative of the inflation pressure of the tire sensed by the sensing unit 21 along with the ID information indicative of the identity of the transceiver 2. Further, the controlling unit 22a controls the transmitting unit 22b to repeatedly transmit the frame at predetermined time intervals (e.g., 1 minute).

The controlling unit 32b of the receiver 3 receives all the frames transmitted by the transceivers 2 via the receiving antenna 31 and the receiving unit 32a.

Then, the controlling unit 32b identifies, for each of the received frames, the wheel on which the transceiver 2 having transmitted the frame is mounted through matching the ID information contained in the frame with a coinciding one of all the reference ID information registered in the memory.

Further, the controlling unit 32b determines, for each of the received frames, the inflation pressure of the tire that is located on the same wheel as the transceiver 2 having transmitted the frame based on the tire pressure information contained in the frame.

In addition, each of the frames transmitted by the transceivers 2 may contain tire temperature information indicative of the temperature of air within the associated tire, so that the controlling unit 32b of the receiver 3 can perform, if necessary, temperature compensation for the determined inflation pressure of the tires based on the temperature information contained in the respective received frames.

Consequently, both the inflation pressure and location of each of the tires are determined by the controlling unit 32b. When the determined inflation pressure of any of the tires is decreased below the predetermined threshold Th, the controlling unit 32b informs, via the warning device 4, the driver of both the inflation pressure and location of the flattened tire.

Additionally, it is possible to change the time intervals for sensing and frame transmission of each of the transceivers 2 according to change in the inflation pressure of the associated tire. For example, when a difference between two successively determined values of the inflation pressure of the associated tire exceeds a predetermined threshold, the time intervals may be decreased, for example, from 1 minute to 5 sec.

When the ignition switch of the vehicle 1 is turned from on to off, the controlling unit 32b of the receivers 3 transmits a stop command signal to the triggering devices 5a and 5b, thereby causing them to transmit a stop trigger signal. Upon receiving the stop trigger signal via the receiving antenna 25 and the receiving unit 22c, the controlling unit 22a of each of the transceivers 2 is deactivated, thus completing the entire operation of the tire inflation pressure detecting apparatus S1.

With the above-described configuration of the tire inflation pressure detecting apparatus S1, the receiver 3 can automatically and accurately identify, for each of the transceivers 2, the one of the running and spare wheels 6a-6e on which it is mounted.

Accordingly, with the above configuration, the tire inflation pressure detecting apparatus S1 can automatically and reliably carry out the ID registration without performing the conventional time-consuming manual operation.

Moreover, it is possible for all the transceivers 2 to have the same configuration and for the receiver 3 to include only the single receiving antenna 31, thus reducing the manufacturing cost of the tire inflation pressure detecting apparatus S1.

Second Embodiment

This embodiment illustrates a wheel identification method which is different from the wheel identification method according to the previous embodiment.

In the previous embodiment, the controlling unit 32b of the receiver 3 identifies, for each of the transceivers 2 on the front wheels 6a and 6b, whether it is mounted on the FR wheel 6a or on the FL wheel 6b through comparing the strengths of the trigger signal thereat.

In comparison, in the present embodiment, the controlling unit 32b identifies, for each of all the transceivers 2 on the running and spare wheels 6a-6e, the wheel on which it is mounted through comparing the variations in the strengths of the trigger signal thereat.

Figure 11B:
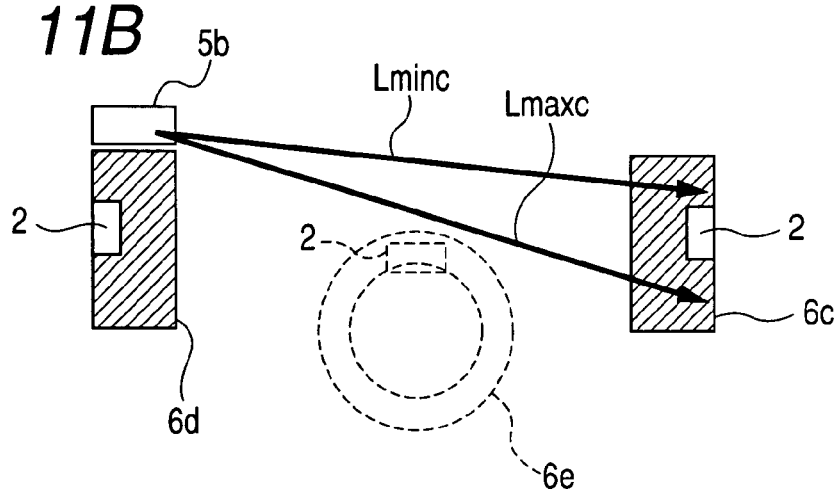
FIG. 11B is a schematic view illustrating variation in the distance between the rear-side triggering device and the transceiver on the RR wheel of the vehicle.
Figure 11C:
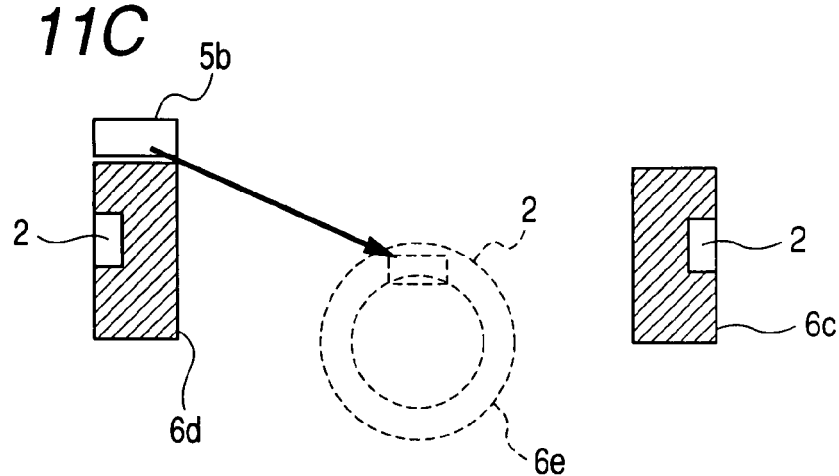
FIG. 11C is a schematic view illustrating zero variation in the distance between the rear-side triggering device and the transceiver on the spare wheel of the vehicle.

More specifically, referring again FIGS. 11A and 11B, during running of the vehicle 1, the distance between the triggering device 5b and the transceiver 2 on the RL wheel 6d varies in the range from Lmind to Lmaxd, while the distance between the triggering device 5b and the transceiver 2 on the RR wheel 6c varies in the range from Lminc to Lmaxc. Further, since the triggering device 5b is closer to the RL wheel 6d than the RR wheel 6c, the difference (Lmaxd-Lmind) is greater than the difference (Lmaxc-Lminc). In other words, the variation in the distance between the triggering device 5b and the transceiver 2 on the RL wheel 6d is greater than that in the distance between the triggering device 5b and the transceiver 2 on the RR wheel 6c.

Consequently, as shown in FIGS. 12A and 12B, the variation in the strength of the trigger signal at the transceiver 2 on the RL wheel 6d is greater than that at the transceiver 2 on the RR wheel 6c. In addition, as shown in FIG. 12C, the variation in the strength of the trigger signal at the transceiver 2 on the spare wheel 6e is zero.

Similarly, though not graphically shown, the variation in the strength of the trigger signal at the transceiver 2 on the FL wheel 6b is greater than that at the transceiver 2 on the FR wheel 6a.

Accordingly, it is possible to identify, for each of all the transceivers 2 on the running and spare wheels 6a-6e, the wheel on which it is mounted through comparing the variations in the strengths of the trigger signal thereat.

FIG. 13 shows a process of the controlling unit 32b of the receiver 3 in the ID registration mode according to the present embodiment. This process is a modification of the process shown in FIG. 5, and thus only the modified parts will be described hereinafter.

First, though not shown in FIG. 13, the controlling unit 32b makes a determination as to whether the vehicle 1 is running based on the vehicle speed information from the vehicle speed sensor 8.

If the vehicle 1 is running, the process proceeds to the step S1'; otherwise, the process repeats the above determination.

At the step S1', the controlling unit 32b outputs the command signal to the triggering device 5a a plurality of times at predetermined intervals, so that the triggering device 5a transmits the trigger signal the plurality of times at the predetermined intervals.

As in the previous embodiment, the intervals for transmitting the trigger signal are so predetermined that each of the transceivers 2 receives the trigger signal at a plurality of different angular positions thereof with respect to the rotational axis X of the corresponding wheel.

At the succeeding step S2', the controlling unit 32b determines whether an adequate number of frames from two transceivers 2 are received thereby. The adequate number of frames is necessary for determining the variations in the strengths of the trigger signal at the front wheels 6a and 6b.

If the determination at the step S2' produces a "NO" answer, then the process returns to the step S1'.

Otherwise, if the determination at the step S2' produces a "YES" answer, then the process proceeds to the step S3'.

At the step S3', the controlling unit 32b identifies, for each of the two transceivers 2, whether it is mounted on the FR wheel 6a or the FL wheel 6b.

More specifically, the controlling unit 32b retrieves the signal strength information and ID information from the received frames. Then, the controlling unit 32b classifies the received frames into two different groups so that the members of the same group contain the same ID information. Further, the controlling unit 32b determines, for each of the groups, the variation in the strength of the trigger signal at the corresponding transceiver 2 based on the signal strength information contained in the frames of the group. As in the previous embodiment, the variation is determined as the difference between a maximum and a minimum value of the strength at the corresponding transceiver 2. Thereafter, the controlling unit 32b of the receiver 3 compares the determined variations, and identifies the transceiver 2 which has transmitted the group of frames resulting in the greater variation as being mounted on the FL wheel 6b and the other as being mounted on the FR wheel 6a.

Further, at the step S7', the controlling unit 32b performs the same process for the transceivers 2 on the rear wheels 6c and 6d as for those on the FR wheels 6a and 6b. The step S7' is composed of the steps 12-14, which respectively correspond to the above-described step S1'-S3'. Accordingly, the description of the step S7' is omitted here.

Furthermore, at the step S11', the controlling unit 32b identifies, for each of the three transceivers 2, the one of the rear and spare wheels 6c-6e on which it is mounted.

More specifically, the controlling unit 32b retrieves the signal strength information and ID information from the received frames. Then, the controlling unit 32b classifies the received frames into three different groups so that the members of the same group contain the same ID information. Further, the controlling unit 32b determines, for each of the groups, the variation in the strength of the trigger signal at the corresponding transceiver 2 based on the signal strength information contained in the frames of the group. Thereafter, the controlling unit 32b compares the determined variations. Based on the comparison, the controlling unit 32b identifies the transceiver 2 which has transmitted the group of frames resulting in the greatest variation as being mounted on the RL wheel 6d, the transceiver 2 which has transmitted the group of frames resulting in the least (i.e., zero) variation as being mounted on the spare wheel 6e, and the remaining transceiver 2 as being mounted on the RR wheel 6c.

Through performing the above process according to the present embodiment, it is also possible for the receiver 3 to automatically and accurately identify, for each of the transceivers 2, the one of the running and spare wheels 6a-6e on which it is mounted.

[Other Variations]

Variation 1

In the second embodiment, the variations in the strengths of the trigger signal at the transceivers 2 are determined by the controlling unit 32b of the receiver 3.

Alternatively, the variations may be determined by the respective controlling units 22a of the transceivers 2.

More specifically, the triggering device 5a or 5b transmits the trigger signal a plurality of times. The controlling units 22a of the transceivers 2 determine the strengths of the trigger signal thereat the plurality of times, and then determine the variations in the determined strengths. Thereafter, the controlling units 22a control the corresponding transmitting units 22b to transmit frames, each of which contains ID information and variation information indicating the determined variation. Upon receiving the frames, the controlling unit 32b of the receiver 3 identifies, for each of the frames, the wheel on which the transceiver 2 having transmitted the frame is mounted through a comparison of the variations indicated by the variation information contained in the frames.

Variation 2

In the previous embodiments, each of the transceivers 2 is configured to include the transmitting unit 22b, the receiving unit 22c, the transmitting antenna 24, and the receiving antenna 25. This is because the frequency at which the trigger signal is transmitted is different from that at which the frame is transmitted.

However, in cases where the two frequencies are same, it is also possible to integrate the transmitting unit 22b and the receiving unit 22c into a single transmitting/receiving unit and the transmitting antenna 24 and the receiving antenna 25 into a single transmitting/receiving antenna.

Variation 3

In the previous embodiments, both the triggering devices 5a and 5b are located on the left side of the centerline C-C extending in the longitudinal direction of the vehicle 1.

Alternatively, either or both of the triggering devices 5a and 5b may be located on the right side of the centerline C-C.

Variation 4

In the previous embodiments, two triggering devices 5a and 5b are employed for transmitting the trigger signal.

However, to the extent that the trigger signal transmitted by a single triggering device may be detected by all of the transceivers 2, the number of triggering devices can be reduced to one.

Further, it is also possible to employ three triggering devices for transmitting the trigger signal.

Variation 5

In the previous embodiments, the receiver 3 includes only the single receiving antenna 31 to receive all of the frames transmitted by the transceivers 2.

However, the receiver 3 may have a different number of receiving antennas 31. For example, the receiver 3 may include four receiving antennas 31, each of which corresponds to one of the four running wheels 6a-6d.

It is to be appreciated that the present invention is especially effective when the receiver 3 includes only the single receiving antenna 31 and thus it is difficult to distinguish the frames transmitted by the transceivers 2 from one another.

Variation 6

In the previous embodiments, the tire inflation pressure detecting apparatus S1 is configured to operate in the two different modes, i.e., the ID registration mode and the tire pressure detection mode.

However, the tire inflation pressure detecting apparatus S1 may be configured to operate only in a single mode in which: each of the transceivers 2 repeatedly transmits, at the predetermined time intervals (e.g., 1 minute), the frame that contains, in addition to the tire pressure information, the signal strength information indicating the strength of the trigger signal at the transceiver 2 or the variation information indicating the variation in the strength of the trigger signal at the transceiver 2; the receiver 3 identifies, for each of the frames received from the transceivers 2, the wheel on which the transceiver 2 having transmitted the frame is mounted based on the signal strength information or the variation information contained in the frame; the receiver 3 further determines, for each of the frames, the inflation pressure of the tire that is located on the same wheel as the transceiver 2 having transmitted the frame based on the tire pressure information contained in the frame.

With such a configuration, it is possible to automatically and accurately detect the locations as well as the inflation pressure of the tires without using any ID information.

Variation 7

In the second embodiment, to determine the variations in the strengths of the trigger signal at the transceivers 2, the triggering devices 5a and 5b are configured to transmit the trigger signal multiple times.

However, the triggering devices 5a and 5b may be alternatively configured to transmit the trigger signal only a single time for a sufficiently long time period, so that the controlling units 22a of the corresponding transceivers 2 can determine the strengths of the trigger signal thereat multiple times for that time period.

Then, as in the above-described variation 1, the controlling units 22a further determine the variations in the determined strengths thereat and control the corresponding transmitting units 22b to transmit frames, each of which contains ID information and variation information indicating the determined variation. Upon receiving the frames, the controlling unit 32b of the receiver 3 identifies, for each of the frames, the wheel on which the transceiver 2 having transmitted the frame is mounted through a comparison of the variations indicated by the variation information contained in the frames.

With the above configuration, it is possible to shorten the time required for the controlling units 22a to determine the variations in the strengths of the trigger signal thereat and simply the wheel identification process of the controlling unit 32b of the receiver 3.

While the above particular embodiments and variations of the invention have been shown and described, it will be understood by those who practice the invention and those skilled in the art that further modifications, changes, and improvements may be made to the invention without departing from the spirit of the disclosed concept. Such modifications, changes, and improvements within the skill of the art are intended to be covered by the appended claims.

What is claimed is:

1. A wheel identifying apparatus comprising:
a transmitter located on a body of a vehicle and working to transmit a signal during running of the vehicle;
a signal strength determiner located on a wheel of the vehicle away from a rotational axis of the wheel, the signal strength determiner working to determine strength of the signal thereat;
a variation determiner working to determine a variation in the strength of the signal determined by the signal strength determiner; and
a wheel identifier configured to identify the wheel as being located on the body of the vehicle when the variation determined by the variation determiner is substantially zero.

2. The wheel identifying apparatus as set forth in claim 1, wherein both the variation determiner and the wheel identifier are located on the wheel of the vehicle.

3. The wheel identifying apparatus as set forth in claim 2, wherein the signal strength determiner, the variation determiner, and the wheel identifier are integrated into a single device.

4. The wheel identifying apparatus as set forth in claim 1, further comprising a second transmitter located on the wheel of the vehicle and a receiver located on the body of the vehicle,
wherein
both the variation determiner and the wheel identifier are located on the body of the vehicle,
the second transmitter working to transmit a second signal containing information indicating the strength of the signal determined by the signal strength determiner,
the receiver working to receive the second signal transmitted by the second transmitter, and
the variation determiner determines the variation in the strength of the signal based on the information contained in the second signal received by the receiver.

5. The wheel identifying apparatus as set forth in claim 1, further comprising a second transmitter located on the wheel of the vehicle and a receiver located on the body of the vehicle,
wherein
the variation determiner is located on the wheel of the vehicle and the wheel identifier is located on the body of the vehicle,
the second transmitter working to transmit a second signal containing information indicating the variation determined by the variation determiner,
the receiver working to receive the second signal transmitted by the second transmitter, and
the wheel identifier identifies the wheel as being located on the body of the vehicle when the variation indicated by the information contained in the second signal received by the receiver is substantially zero.

6. The wheel identifying apparatus as set forth in claim 1, wherein the transmitter is configured to transmit the signal a plurality of times at predetermined intervals, and wherein the intervals are so predetermined that the signal strength determiner determines the strength of the signal at a plurality of different angular positions with respective to the rotational axis of the wheel.

7. A wheel identifying apparatus comprising:
a triggering device located on a body of a vehicle at different distances from a plurality of running wheels of the vehicle and working to transmit a trigger signal during running of the vehicle;
a plurality of transceivers each of which is located on a corresponding one of the running wheels away from a rotational axis of the corresponding running wheel, each of the transceivers being configured to receive the trigger signal, determine strength of the trigger signal thereat, and transmit a response signal containing information indicating the determined strength in response to receipt of the trigger signal;
a receiver located on the body of the vehicle and working to receive the response signals transmitted by the transceivers;
a variation determiner located on the body of the vehicle and working to determine, for each of the response signals received by the receiver, a variation in the strength of the trigger signal at the transceiver having transmitted the response signal based on the information contained in the response signal, the variations determined for the response signals being to be inversely proportional to the distances from the triggering device to the corresponding running wheels; and
a wheel identifier located on the body of the vehicle and working to identify, for each of the response signals received by the receiver, the running wheel on which the transceiver having transmitted the response signal is located through a comparison of the variations determined by the variation determiner.

8. The wheel identifying apparatus as set forth in claim 7, wherein the receiver, the variation determiner, and the wheel identifier are integrated into a single device.

9. The wheel identifying apparatus as set forth in claim 7, wherein the triggering device is configured to transmit the trigger signal a plurality of times at predetermined intervals, and wherein the intervals are so predetermined that each of the transceivers determines the strength of the trigger signal at a plurality of different angular positions with respective to the rotational axis of the corresponding running wheel.

10. A wheel identifying apparatus comprising:
a triggering device located on a body of a vehicle at different distances from a plurality of running wheels of the vehicle and working to transmit a trigger signal during running of the vehicle;
a plurality of transceivers each of which is located on a corresponding one of the running wheels away from a rotational axis of the corresponding running wheel, each of the transceivers being configured to receive the trigger signal, determine a variation in strength of the trigger signal thereat, and transmit a response signal containing information indicating the determined variation in response to receipt of the trigger signal, the determined variations being to be inversely proportional to the distances from the triggering device to the corresponding running wheels;
a receiver located on the body of the vehicle and working to receive the response signals transmitted by the transceivers; and
a wheel identifier located on the body of the vehicle and working to identify, for each of the response signals received by the receiver, the running wheel on which the transceiver having transmitted the response signal is located through a comparison of the variations indicated by the information contained in the response signals.

11. The wheel identifying apparatus as set forth in claim 10, wherein the receiver and the wheel identifier are integrated into a single device.

12. The wheel identifying apparatus as set forth in claim 10, wherein the triggering device is configured to transmit the trigger signal a plurality of times at predetermined intervals, and wherein the intervals are so predetermined that each of the transceivers determines the strength of the trigger signal at a plurality of different angular positions with respective to the rotational axis of the corresponding running wheel.

13. A wheel identifying apparatus for a vehicle, wherein the vehicle includes a plurality of running wheels and a spare wheel located on a body of the vehicle, the wheel identifying apparatus comprising:
    a triggering device located on the body of the vehicle at different distances from the running wheels of the vehicle and working to transmit a trigger signal during running of the vehicle;
    a plurality of transceivers each of which is located on a corresponding one of the running and spare wheels away from a rotational axis of the corresponding wheel, each of the transceivers being configured to receive the trigger signal, determine strength of the trigger signal thereat, and transmit a response signal containing information indicating the determined strength in response to receipt of the trigger signal;
    a receiver located on the body of the vehicle and working to receive the response signals transmitted by the transceivers;
    a variation determiner located on the body of the vehicle and working to determine, for each of the response signals received by the receiver, a variation in the strength of the trigger signal at the transceiver having transmitted the response signal based on the information contained in the response signal; and
    a wheel identifier located on the body of the vehicle, the wheel identifier being configured to identify one of the response signals received by the receiver as being transmitted by the transceiver on the spare wheel of the vehicle when the variation determined by the variation determiner for the one of the response signals is substantially zero.

14. The wheel identifying apparatus as set forth in claim 13, wherein after identifying the response signal which has been transmitted by the transceiver on the spare wheel, the wheel identifier further identifies, for each of the remaining response signals, the running wheel on which the transceiver having transmitted the response signal is located through a comparison of the strengths indicated by the information contained in the remaining response signals, the strengths being inversely proportional to the distances from the triggering device to the corresponding running wheels.

15. The wheel identifying apparatus as set forth in claim 13, wherein after identifying the response signal which has been transmitted by the transceiver on the spare wheel of the vehicle, the wheel identifier further identifies, for each of the remaining response signals, the running wheel on which the transceiver having transmitted the response signal is located through a comparison of the variations determined by the variation determiner for the remaining response signals, the variations being inversely proportional to the distances from the triggering device to the corresponding running wheels.

16. The wheel identifying apparatus as set forth in claim 13, wherein the receiver, the variation determiner, and the wheel identifier are integrated into a single device.

17. The wheel identifying apparatus as set forth in claim 13, wherein the triggering device is configured to transmit the trigger signal a plurality of times at predetermined intervals, and wherein the intervals are so predetermined that each of the transceivers on the running wheels of the vehicle determines the strength of the trigger signal at a plurality of different angular positions with respective to the rotational axis of the corresponding running wheel.

18. A wheel identifying apparatus for a vehicle, wherein the vehicle includes two front wheels, two rear wheels, and a spare wheel that is located on a body of the vehicle closer to the rear wheels than the front wheels, the wheel identifying apparatus comprising:
    a first triggering device located on the body of the vehicle closer to the front wheels than the rear wheels at different distances from the front wheels;
    a second triggering device located on the body of the vehicle closer to the rear wheels than the front wheels at different distances from the rear wheels;
    five transceivers each of which is located on a corresponding one of the five wheels of the vehicle away from a rotational axis of the corresponding wheel;
    a receiver located on the body of the vehicle;
    a variation determiner located on the body of the vehicle; and
    a wheel identifier located on the body of the vehicle,
    wherein the wheel identifying apparatus is so configured that:
    the first triggering device transmits a first trigger signal during running of the vehicle,
    each of the two transceivers on the front wheels receives the first trigger signal, determines the strength of the first trigger signal thereat, and transmits a first response signal containing information indicating the determined strength in response to receipt of the first trigger signal, the determined strengths being to be inversely proportional to the distances from the first triggering device to the corresponding front wheels,
    the receiver receives the first response signals transmitted by the transceivers on the front wheels,
    the wheel identifier identifies, for each of the first response signals received by the receiver, the front wheel on which the transceiver having transmitted the first response signal is located through a comparison of the strengths indicated by the information contained in the first response signals,
    the second triggering device transmits a second trigger signal during running of the vehicle,
    each of the three transceivers on the rear and spare wheels receives the second trigger signal, determines the strength of the second trigger signal thereat, and transmits a second response signal containing information indicating the determined strength in response to receipt of the second trigger signal, the determined strengths being to be inversely proportional to the distances from the second triggering device to the corresponding ones of the rear and spare wheels,
    the receiver receives the second response signals transmitted by the transceivers on the rear and spare wheels,
    the wheel identifier identifies one of the second response signals received by the receiver which contains the information indicating the maximum one of the strengths of the second trigger signal at the rear and spare wheels as being transmitted by the transceiver on the rear wheel closer to the second triggering device,
    the variation determiner determines, for each of the remaining second response signals, a variation in the strength of the second trigger signal at the transceiver having transmitted the second response signal based on the information contained in the second response signal, of the determined variations, only the variation in the strength of the second trigger signal at the transceiver on the spare wheel being to be substantially zero, and the wheel identifier identifies, for each of the remaining second response signals, the wheel on which the transceiver having transmitted the second response signal is located based on whether the variation determined by the variation determiner for the second response signal is substantially zero.

19. The wheel identifying apparatus as set forth in claim 18, wherein the receiver, the variation determiner, and the wheel identifier are integrated into a single device.

20. A tire inflation pressure detecting apparatus comprising:
 a triggering device located on a body of a vehicle at different distances from a plurality of running wheels of the vehicle and working to transmit a trigger signal during running of the vehicle;
 a plurality of pressure sensors each of which is located on a corresponding one of the running wheels and works to sense inflation pressure of a tire fitted on the corresponding running wheel;
 a plurality of transceivers each of which is located on a corresponding one of the running wheels away from a rotational axis of the corresponding running wheel, each of the transceivers being configured to receive the trigger signal, determine strength of the trigger signal thereat, and transmit a response signal containing both first and second information in response to receipt of the trigger signal, the first information indicating the inflation pressure of the tire sensed by the corresponding pressure sensor, the second information indicating the strength of the trigger signal determined by the transceiver;
 a receiver located on the body of the vehicle and working to receive the response signals transmitted by the transceivers;
 a pressure determiner located on the body of the vehicle and working to determine, for each of the response signals received by the receiver, the inflation pressure of the tire fitted on the corresponding running wheel based on the first information contained in the response signal;
 a variation determiner located on the body of the vehicle and working to determine, for each of the response signals received by the receiver, a variation in the strength of the trigger signal at the transceiver having transmitted the response signal based on the second information contained in the response signal, the variations determined for the response signals being to be inversely proportional to the distances from the triggering device to the corresponding running wheels; and
 a wheel identifier located on the body of the vehicle and working to identify, for each of the response signals received by the receiver, the running wheel on which the transceiver having transmitted the response signal is located through a comparison of the variations determined by the variation determiner.

21. The tire inflation pressure detecting apparatus as set forth in claim 20, wherein the pressure sensor and the transceiver on each of the running wheels are integrated into a single device, while the receiver, the pressure determiner, the variation determiner, and the wheel identifier are integrated into a single device.

22. A tire inflation pressure detecting apparatus comprising:
 a triggering device located on a body of a vehicle at different distances from a plurality of running wheels of the vehicle and working to transmit a trigger signal during running of the vehicle;
 a plurality of pressure sensors each of which is located on a corresponding one of the running wheels and works to sense inflation pressure of a tire fitted on the corresponding running wheel;
 a plurality of transceivers each of which is located on one of the running wheels of the vehicle away from a rotational axis of the running wheel, each of the transceivers being configured to receive the trigger signal, determine a variation in strength of the trigger signal thereat, and transmit a response signal containing both first and second information in response to receipt of the trigger signal, the first information indicating the inflation pressure of the tire sensed by the corresponding pressure sensor, the second information indicating the variation in strength of the trigger signal determined by the transceiver, the determined variations being to be inversely proportional to the distances from the triggering device to the corresponding running wheels;
 a receiver located on the body of the vehicle and working to receive the response signals transmitted by the transceivers;
 a pressure determiner located on the body of the vehicle and working to determine, for each of the response signals received by the receiver, the inflation pressure of the tire fitted on the corresponding running wheel based on the first information contained in the response signal; and
 a wheel identifier located on the body of the vehicle and working to identify, for each of the response signals received by the receiver, the running wheel on which the transceiver having transmitted the response signal is located through a comparison of the variations indicated by the second information in the response signals.

23. The tire inflation pressure detecting apparatus as set forth in claim 22, wherein the pressure sensor and the transceiver on each of the running wheels are integrated into a single device, while the receiver, the pressure determiner, and the wheel identifier are integrated into a single device.

24. A tire inflation pressure detecting apparatus for a vehicle, wherein the vehicle includes a plurality of running wheels and a spare wheel located on a body of the vehicle, the tire inflation pressure detecting apparatus comprising:
 a triggering device located on the body of the vehicle at different distances from the running wheels of the vehicle and working to transmit a trigger signal during running of the vehicle;
 a plurality of pressure sensors each of which is located on a corresponding one of the running and spare wheels of the vehicle and works to sense inflation pressure of a tire fitted on the corresponding wheel;
 a plurality of transceivers each of which is located on a corresponding one of the running and spare wheels away from a rotational axis of the corresponding wheel, each of the transceivers being configured to receive the trigger signal, determine strength of the trigger signal thereat, and transmit a response signal containing both first and second information in response to receipt of the trigger signal, the first information indicating the inflation pressure of the tire sensed by the corresponding pressure sensor, the second information indicating the strength of the trigger signal determined by the transceiver;

a receiver located on the body of the vehicle and working to receive the response signals transmitted by the transceivers;

a pressure determiner located on the body of the vehicle and working to determine, for each of the response signals received by the receiver, the inflation pressure of the tire fitted on the corresponding wheel based on the first information contained in the response signal;

a variation determiner located on the body of the vehicle and working to determine, for each of the response signals received by the receiver, a variation in the strength of the trigger signal at the transceiver having transmitted the response signal based on the second information contained in the response signal; and a wheel identifier located on the body of the vehicle, the wheel identifier being configured to identify one of the response signals received by the receiver as being transmitted by the transceiver on the spare wheel when the variation determined by the variation determiner for the one of the response signals is substantially zero.

25. The tire inflation pressure detecting apparatus as set forth in claim 24, wherein after identifying the response signal which has been transmitted by the transceiver on the spare wheel, the wheel identifier further identifies, for each of the remaining response signals, the running wheel on which the transceiver having transmitted the response signal is located through a comparison of the strengths indicated by the second information contained in the remaining response signals, the strengths being inversely proportional to the distances from the triggering device to the corresponding running wheels.

26. The tire inflation pressure detecting apparatus as set forth in claim 24, wherein after identifying the response signal which has been transmitted by the transceiver on the spare wheel, the wheel identifier further identifies, for each of the remaining response signals, the running wheel on which the transceiver having transmitted the response signal is located through a comparison of the variations determined by the variation determiner for the remaining response signals, the variations being inversely proportional to the distances from the triggering device to the corresponding running wheels.

27. The tire inflation pressure detecting apparatus as set forth in claim 24, wherein the pressure sensor and the transceiver on each of the running and spare wheels are integrated into a single device, while the receiver, the pressure determiner, the variation determiner, and the wheel identifier are integrated into a single device.

* * * * *